US010547993B2

(12) United States Patent
Kuang et al.

(10) Patent No.: US 10,547,993 B2
(45) Date of Patent: Jan. 28, 2020

(54) MEDIA CONTENT SHARING METHOD AND APPARATUS

(71) Applicant: Huawei Technologies Co., Ltd., Shenzhen, Guangdong (CN)

(72) Inventors: Yunsheng Kuang, Shenzhen (CN); Yu Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 448 days.

(21) Appl. No.: 15/314,453

(22) PCT Filed: May 29, 2014

(86) PCT No.: PCT/CN2014/078830
§ 371 (c)(1),
(2) Date: Nov. 28, 2016

(87) PCT Pub. No.: WO2015/180108
PCT Pub. Date: Dec. 3, 2015

(65) Prior Publication Data
US 2017/0201852 A1    Jul. 13, 2017

(51) Int. Cl.
| | | |
|---|---|---|
| *H04L 9/32* | (2006.01) | |
| *H04W 4/80* | (2018.01) | |
| *H04W 12/06* | (2009.01) | |
| *H04L 9/08* | (2006.01) | |

(Continued)

(52) U.S. Cl.
CPC .............. *H04W 4/80* (2018.02); *H04L 9/0861* (2013.01); *H04L 63/0428* (2013.01); *H04L 63/083* (2013.01); *H04W 12/06* (2013.01); *H04L 67/06* (2013.01)

(58) Field of Classification Search
CPC ....... H04W 4/80; H04W 12/02; H04W 12/06; H04L 9/0861; H04L 63/0428; H04L 63/083; H04L 67/06
See application file for complete search history.

(56) References Cited

U.S. PATENT DOCUMENTS

| | | | |
|---|---|---|---|
| 7,654,455 B1* | 2/2010 | Bhatti | G06Q 10/087 |
| | | | 235/381 |
| 2007/0066304 A1* | 3/2007 | Lee | H04W 48/20 |
| | | | 455/436 |

(Continued)

FOREIGN PATENT DOCUMENTS

| | | |
|---|---|---|
| CN | 102571776 A | 12/2011 |
| CN | 102510371 A | 6/2012 |

(Continued)

*Primary Examiner* — John B King
*Assistant Examiner* — Darshan I Dhruv
(74) *Attorney, Agent, or Firm* — Kilpatrick Townsend & Stockton LLP

(57) ABSTRACT

Embodiments of the present invention provide a media content sharing method and apparatus. The media content sharing method includes: using, by a first device, a private sharing mode, and acquiring first private information corresponding to the private sharing mode; and sending or displaying, by the first device, the first private information to a second device, so that the second device acquires the first private information and acquires shared media content of the first device according to the first private information.

9 Claims, 13 Drawing Sheets

FIG. 9

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 2007/0147618 | A1* | 6/2007 | Horn | H04L 63/06 380/277 |
| 2009/0037732 | A1* | 2/2009 | Boccon-Gibod | G06F 21/10 713/168 |
| 2009/0164774 | A1* | 6/2009 | Sherkin | H04L 9/3066 713/155 |
| 2010/0146134 | A1* | 6/2010 | Kobayashi | G06F 21/10 709/229 |
| 2010/0146614 | A1* | 6/2010 | Savoor | H04L 63/0823 726/10 |
| 2011/0060797 | A1 | 3/2011 | Balandin et al. | |
| 2011/0122858 | A1* | 5/2011 | Yashiro | H04W 64/00 370/338 |
| 2011/0295962 | A1* | 12/2011 | Yasuma | G06F 9/5055 709/206 |
| 2012/0224693 | A1* | 9/2012 | Lei | G06K 7/0008 380/270 |
| 2012/0275595 | A1* | 11/2012 | Emelko | H04L 9/0897 380/44 |
| 2012/0289154 | A1* | 11/2012 | Son | H04W 36/0055 455/41.1 |
| 2013/0023262 | A1* | 1/2013 | Zhang | H04W 48/18 455/418 |
| 2013/0086168 | A1 | 4/2013 | Han et al. | |
| 2013/0298194 | A1* | 11/2013 | Nakajima | H04W 12/06 726/3 |
| 2014/0059707 | A1* | 2/2014 | Cho | H04W 12/08 726/29 |
| 2014/0137268 | A1 | 5/2014 | Fang | |
| 2014/0140331 | A1* | 5/2014 | Lee | H04L 63/10 370/338 |
| 2014/0164785 | A1* | 6/2014 | Ochiai | H04L 9/002 713/189 |
| 2014/0168702 | A1* | 6/2014 | Morita | H04N 1/00278 358/1.15 |
| 2014/0215579 | A1 | 7/2014 | Zhang et al. | |
| 2014/0359738 | A1* | 12/2014 | Nakajima | H04L 63/08 726/7 |
| 2014/0372528 | A1* | 12/2014 | Nishiguchi | H04L 47/70 709/204 |
| 2015/0105115 | A1* | 4/2015 | Hata | H04W 28/0231 455/509 |
| 2015/0143119 | A1* | 5/2015 | Matsunaga | H04L 63/061 713/168 |
| 2015/0312622 | A1* | 10/2015 | Candelore | H04N 21/43615 725/37 |
| 2015/0334632 | A1* | 11/2015 | Rudolph | H04W 48/02 726/4 |
| 2015/0365375 | A1* | 12/2015 | Liao | H04L 51/28 709/206 |
| 2016/0337449 | A1* | 11/2016 | Yang | H04N 21/4126 |

FOREIGN PATENT DOCUMENTS

| | | | |
|---|---|---|---|
| CN | 102665211 A | 9/2012 | |
| CN | 102789463 A | 11/2012 | |
| CN | 103108326 A | 5/2013 | |
| CN | 103248616 A | 8/2013 | |
| CN | 103384232 A | 11/2013 | |
| EP | 2723112 A1 | 4/2014 | |
| WO | 2006069967 A1 | 7/2006 | |
| WO | WO 2014/117355 * | 1/2013 | ............ H04L 20/06 |
| WO | WO 2014/141595 * | 2/2014 | ........ H04L 63/0428 |

* cited by examiner

MEDIA CONTENT SHARING METHOD AND APPARATUS

CROSS REFERENCE TO RELATED APPLICATIONS

The present application claims priority under 35 U.S.C. § 365 to International Patent Application No. PCT/CN2014/078830 filed May 29, 2014, which is incorporated herein by reference into the present disclosure as if fully set forth herein.

TECHNICAL FIELD

Embodiments of the present invention relate to the field of communications, and in particular, to a media content sharing method and apparatus.

BACKGROUND

With fast development of Internet technologies and services, Internet media content increases and becomes diversified, including music, movies, TV series, news, self-made video clips, and the like. Popularity of Internet media greatly enriches visual and aural experience of users. To realize that a device in a home network also has a content sharing function while playing Internet media content, that is, to switch Internet media content played on one device to another device for playing, currently, the device in the home network mainly uses a Digital Living Network Alliance (Digital Living Network Alliance, DLNA for short) device. The device uses a universal plug and play (Universal Plug and Play, UPnP for short) Audio with Video (UPnP Audio & Video, UPnP AV for short) standard. That is, in a DLNA protocol architecture, DLNA devices can implement a series of steps such as device discovery, device service description, device control, event transfer, and content presentation by using a UPnP device architecture and the UPnP AV protocol as long as the DLNA devices are connected to a same wireless local area network (Wireless Local Area Networks, WLAN for short), thereby implementing transmission and sharing of media content between the DLNA devices.

In addition, according to the DLNA specification, when a DLNA device goes online, the DLNA device multicasts an online message or a search message to a whole WLAN for mutual discovery of devices. All DLNA devices that are connected to the WLAN network and have a control function can receive an online message multicast by another DLNA device having a media service function, and acquire a media content list stored by the DLNA device having the media service function.

However, when a WLAN accessed by the DLNA device having the media service function is a public Wi-Fi network such as a network at an airport, in a shopping mall, or in a dining hall, this device and a service mechanism have a risk of privacy leakage in this case, that is, any control point device that accesses the public Wi-Fi network can discover an online DLNA device and acquire shared media content of the DLNA device, but the DLAN device knows nothing about this, and consequently, security of the shared media content of the DLAN device is poor.

SUMMARY

Embodiments of the present invention provide a media content sharing method and apparatus, so as to solve a problem that security of shared media content of a DLNA device is poor in the prior art, enhance sharing security of private media content, and avoid privacy leakage.

According to a first aspect, an embodiment of the present invention provides a media content sharing method, including:

using, by a first device, a private sharing mode, and acquiring first private information corresponding to the private sharing mode; and sending or displaying, by the first device, the first private information to a second device, so that the second device acquires the first private information and acquires shared media content of the first device according to the first private information.

With reference to the first aspect, in a first possible implementation manner of the first aspect, the sending or displaying, by the first device, the first private information to the second device specifically includes:

establishing, by the first device, an NFC channel with the second device, and sending the first private information to the second device through the NFC channel; or establishing, by the first device, a Bluetooth piconet with the second device, and sending the first private information to the second device in the Bluetooth piconet; or encoding, by the first device, the first private information to generate a two-dimensional code image, and displaying the first private information corresponding to the two-dimensional code image form, so that the second device captures the two-dimensional code image and acquires the first private information; or encoding, by the first device, the first private information to generate a sound wave signal, and propagating the sound wave signal, so that the second device receives the sound wave signal through a microphone and acquires the first private information by decoding the sound wave signal.

With reference to the first aspect or the first possible implementation manner of the first aspect, in a second possible implementation manner of the first aspect, the first private information includes a private device description document uniform resource locator DDD URL of the first device and a-private universally unique identifier UUID of the first device.

With reference to the second possible implementation manner of the first aspect, in a third possible implementation manner of the first aspect, the sending or displaying, by the first device, the first private information to a second device, so that the second device acquires the first private information and acquires shared media content of the first device according to the first private information includes:

sending or displaying, by the first device, the first private information to the second device, and receiving a first request message sent by the second device, where the first request message carries the private DDD URL of the first device;

sending, by the first device, second private information to the second device according to the first request message, where the second private information includes a private device description document DDD corresponding to the private DDD URL, and the private DDD includes a private Service Control Protocol Description SCPD document URL of the first device, so that the second device acquires a corresponding private SCPD document according to the private SCPD document URL and invokes a corresponding control instruction according to the private SCPD document; and sending, by the first device, a shared media content list of the first device to the second device according to the control instruction, so that the second device acquires the shared media content from the shared media content list, where the control instruction is an instruction invoked by the second device according to the private SCPD document.

With reference to the second or third possible implementation manner of the first aspect, in a fourth possible implementation manner of the first aspect, after the sending or displaying, by the first device, the first private information to the second device, the method further includes:

acquiring, by the first device, a private DDD URL and UUID information of the second device sent by the second device.

With reference to the first aspect or the first possible implementation manner of the first aspect, in a fifth possible implementation manner of the first aspect, the first private information is a private identifier of the first device.

With reference to the fifth possible implementation manner of the first aspect, in a sixth possible implementation manner of the first aspect, the sending or displaying, by the first device, the first private information to a second device, so that the second device acquires the first private information and acquires shared media content of the first device according to the first private information includes:

sending or displaying, by the first device, the first private information to the second device, so that the second device directly accesses the first device according to the private identifier of the first device and acquires the shared media content of the first device.

With reference to the fifth or sixth possible implementation manner of the first aspect, in a seventh possible implementation manner of the first aspect, after the sending or displaying, by the first device, the first private information to the second device, the method further includes:

acquiring, by the first device, a private local domain name of the second device sent by the second device.

With reference to the first aspect or the first possible implementation manner of the first aspect, in an eighth possible implementation manner of the first aspect, the first private information includes a key generated by the first device.

With reference to the eighth possible implementation manner of the first aspect, in a ninth possible implementation manner of the first aspect, the sending or displaying, by the first device, the first private information to a second device, so that the second device acquires the first private information and acquires shared media content of the first device according to the first private information includes:

sending, by the first device, the first private information to the second device, and receiving a first authentication message sent by the second device, where the first authentication message is generated by the second device by encrypting an encryption sequence according to the key;

decrypting, by the first device, the first authentication message according to the key to obtain the encryption sequence, and establishing a secure channel between the first device and the second device according to the encryption sequence; and sending, by the first device, a shared media content list of the first device to the second device on the secure channel according to a control instruction, so that the second device acquires the shared media content from the shared media content list.

With reference to the first aspect or any one of the first to ninth possible implementation manners of the first aspect, in a tenth possible implementation manner of the first aspect, the first device uses the private sharing mode; and before the acquiring first private information corresponding to the private sharing mode, the method further includes:

receiving, by the first device, a private sharing mode configuration instruction sent by a user, and using the private sharing mode according to the instruction.

With reference to the first aspect or any one of the first to ninth possible implementation manners of the first aspect, in an eleventh possible implementation manner of the first aspect, the first device uses the private sharing mode; and before the acquiring first private information corresponding to the private sharing mode, the method further includes:

accessing, by the first device, a wireless local area network WLAN, and acquiring a network identifier of the WLAN;

determining, by the first device according to the network identifier, whether the WLAN is a public network; and if the WLAN is a public network, using the private sharing mode.

With reference to the first aspect or any one of the first to ninth possible implementation manners of the first aspect, in a twelfth possible implementation manner of the first aspect, the first device uses the private sharing mode; and before the acquiring first private information corresponding to the private sharing mode, the method further includes:

accessing, by the first device, a WLAN, and acquiring a network identifier of the WLAN;

determining, by the first device according to the network identifier, whether the first device accesses the WLAN for the first time;

if the first device determines, according to the network identifier, that the WLAN is the WLAN that is accessed by the first device for the first time, generating, by the first device, prompt information to prompt the user whether to select the private sharing mode; and when selection information that is sent by the user according to the prompt information is received and the selection information includes the private sharing mode, using, by the first device, the private sharing mode.

With reference to the first aspect or any one of the first to ninth possible implementation manners of the first aspect, in a thirteenth possible implementation manner of the first aspect, the first device uses the private sharing mode; and before the acquiring first private information corresponding to the private sharing mode, the method further includes:

accessing, by the first device, a WLAN, and acquiring a network identifier of the WLAN;

finding, by the first device, whether the network identifier and a medium access control MAC address of a wireless access point AP corresponding to the network identifier exist in an access point list; and if the network identifier and the MAC address of the AP corresponding to the network identifier exist in the access point list, using, by the first device, the private sharing mode.

According to a second aspect, an embodiment of the present invention provides a media content sharing method, including:

acquiring, by a second device, first private information sent or displayed by a first device, where the second device currently uses a private sharing mode; and acquiring, by the second device, shared media content of the first device according to the first private information.

With reference to the second aspect, in a first possible implementation manner of the second aspect, the acquiring, by a second device, first private information sent or displayed by a first device specifically includes:

establishing, by the second device, an NFC channel with the first device, and receiving, through the NFC channel, the first private information sent by the first device; or establishing, by the second device, a Bluetooth piconet with the first device, and receiving, in the Bluetooth piconet, the first private information sent by the first device; or capturing, by the second device, a two-dimensional code image displayed by the first device, and acquiring the first private information of the first device, where the two-dimensional code image is a two-dimensional code image generated by the first device by encoding the first private information; or receiving, by the second device, a sound wave signal propagated by the first device, and decoding the sound wave signal to acquire the first private information of the first device, where the sound wave signal is a sound wave signal generated by the first device by encoding the first private information.

With reference to the second aspect or the first possible implementation manner of the second aspect, in a second possible implementation manner of the second aspect, the first private information includes a private device description document uniform resource locator DDD URL of the first device and a private universally unique identifier UUID of the first device.

With reference to the second possible implementation manner of the second aspect, in a third possible implementation manner of the second aspect, the acquiring, by a second device, the first private information, and acquiring shared media content of the first device according to the first private information includes:

sending, by the second device, a first request message to the first device, where the first request message carries the private DDD URL of the first device;

receiving, by the second device, second private information sent by the first device, where the second private information includes a private device description document DDD corresponding to the private DDD URL of the first device, and the private DDD includes a private Service Control Protocol Description SCPD document URL of the first device;

acquiring, by the second device, a corresponding private SCPD document from the first device according to the private SCPD document URL, and invoking a corresponding control instruction according to the private SCPD document, so that the first device sends a shared media content list of the first device according to the control instruction; and acquiring, by the second device, the shared media content from the shared media content list.

With reference to the second or third possible implementation manner of the second aspect, in a fourth possible implementation manner of the second aspect, after the acquiring, by a second device, first private information sent or displayed by a first device, the method further includes:

sending or displaying, by the second device, a private DDD URL and UUID information of the second device to the first device.

With reference to the second aspect or the first possible implementation manner of the second aspect, in a fifth possible implementation manner of the second aspect, the first private information is a private identifier of the first device.

With reference to the fifth possible implementation manner of the second aspect, in a sixth possible implementation manner of the second aspect, the acquiring, by a second device, the first private information, and acquiring shared media content of the first device according to the first private information includes:

acquiring, by the second device, the first private information sent by the first device, directly accessing the first device according to the private local domain name of the first device, and acquiring the shared media content of the first device.

With reference to the fifth or sixth possible implementation manner of the second aspect, in a seventh possible implementation manner of the second aspect, after the acquiring, by a second device, first private information sent or displayed by a first device, the method further includes:

sending, by the second device, a private identifier of the second device to the first device.

With reference to the second aspect or the first possible implementation manner of the second aspect, in an eighth possible implementation manner of the second aspect, the first private information includes a key generated by the first device.

With reference to the eighth possible implementation manner of the second aspect, in a ninth possible implementation manner of the second aspect, the acquiring, by a second device, the first private information, and acquiring shared media content of the first device according to the first private information includes:

acquiring, by the second device, the first private information sent or displayed by the first device, and generating a first authentication message by encrypting an encryption sequence according to the key;

sending, by the second device, the first authentication message to the first device, so that the first device decrypts the first authentication message according to the key to obtain the encryption sequence, and establishes a secure channel with the second device according to the encryption sequence; and invoking, by the second device, a control instruction, acquiring, through the secure channel, a shared media content list of the first device sent by the first device, and acquiring the shared media content from the shared media content list.

With reference to the second aspect or any one of the first to ninth possible implementation manners of the second aspect, in a tenth possible implementation manner of the second aspect, that the second device currently uses a private sharing mode includes:

receiving, by the second device, a private sharing mode instruction sent by a user, and using the private sharing mode according to the instruction.

With reference to the second aspect or any one of the first to ninth possible implementation manners of the second aspect, in an eleventh possible implementation manner of the second aspect, that the second device currently uses a private sharing mode includes:

accessing, by the second device, a WLAN, and acquiring a network identifier of the WLAN;

determining, by the second device according to the network identifier, whether the WLAN is a public network; and if the WLAN is a public network, using the private sharing mode.

With reference to the second aspect or any one of the first to ninth possible implementation manners of the second aspect, in a twelfth possible implementation manner of the second aspect, that the second device currently uses a private sharing mode further includes:

accessing, by the second device, a WLAN, and acquiring a network identifier of the WLAN;

determining, by the second device according to the network identifier, whether the second device accesses the WLAN for the first time;

if the second device determines, according to the network identifier, that the second device accesses the WLAN for the first time, generating, by the second device, prompt information to prompt the user whether to select the private sharing mode; and when selection information that is sent by the user according to the prompt information is received and the selection information includes the private sharing mode, using, by the second device, the private sharing mode.

With reference to the second aspect or any one of the first to ninth possible implementation manners of the second aspect, in a thirteenth possible implementation manner of the second aspect, that the second device currently uses a private sharing mode further includes:

accessing, by the second device, a WLAN, and acquiring a network identifier of the WLAN;

finding, by the second device, whether the network identifier and a medium access control MAC address of a wireless access point AP corresponding to the network identifier exist in an access point list; and if the network identifier and the MAC address of the wireless access point AP corresponding to the network identifier exist in the access point list, using, by the second device, the private sharing mode.

According to a third aspect, an embodiment of the present invention provides a media content sharing apparatus, including:

a processing module, configured to, when the media content sharing apparatus uses a private sharing mode, acquire first private information corresponding to the private sharing mode; and a transceiver module, configured to send or display the first private information to a second device, so that the second device acquires the first private information and acquires shared media content of the media content sharing apparatus according to the first private information.

With reference to the third aspect, in a first possible implementation manner of the third aspect, the transceiver module includes:

a near field communication unit, configured to establish an NFC channel with the second device, and send the first private information to the second device through the NFC channel; or a Bluetooth processing unit, configured to establish a Bluetooth piconet with the second device, and send the first private information to the second device in the Bluetooth piconet; or an image encoding unit, configured to encode the first private information to generate a two-dimensional code image, and display the first private information in the two-dimensional code image form, so that the second device captures the two-dimensional code image and acquires the first private information; or a sound wave encoding unit, configured to encode the first private information to generate a sound wave signal, and propagate the sound wave signal, so that the second device receives the sound wave signal through a microphone and acquires the first private information by decoding the sound wave signal.

With reference to the third aspect or the first possible implementation manner of the third aspect, in a second possible implementation manner of the third aspect, the first private information is a private device description document uniform resource locator DDD URL of the media content sharing apparatus and a private universally unique identifier UUID of the media content sharing apparatus; and the transceiver module is specifically configured to:

send or display the first private information to the second device, and receive a first request message sent by the second device, where the first request message carries the private DDD URL of the media content sharing apparatus;

send second private information to the second device according to the first request message, where the second private information includes a private device description document DDD corresponding to the private DDD URL, and the private DDD includes a private Service Control Protocol Description SCPD document URL of the media content sharing apparatus, so that the second device acquires a corresponding private SCPD document according to the private SCPD document URL and invokes a corresponding control instruction according to the private SCPD document; and send a shared media content list of the media content sharing apparatus to the second device according to the control instruction, so that the second device acquires the shared media content from the shared media content list, where the control instruction is an instruction invoked by the second device according to the private SCPD document.

With reference to the second possible implementation manner of the third aspect, in a third possible implementation manner of the third aspect, the transceiver module is further configured to receive a private DDD URL and UUID information of the second device sent by the second device.

With reference to the third aspect or the first possible implementation manner of the third aspect, in a fourth possible implementation manner of the third aspect, the first private information is a private identifier of the media content sharing apparatus; and the transceiver module is specifically configured to:

send or display the first private information to the second device, so that the second device directly accesses the media content sharing apparatus according to the private identifier of the media content sharing apparatus and acquires the shared media content of the media content sharing apparatus.

With reference to the fourth possible implementation manner of the third aspect, in a fifth possible implementation manner of the third aspect, the transceiver module is further configured to receive a private identifier of the second device.

With reference to the third aspect or the first possible implementation manner of the third aspect, in a sixth possible implementation manner of the third aspect, the first private information includes a private identifier of the media content sharing apparatus; and the transceiver module is specifically configured to:

send the first private information to the second device, and receive a first authentication message sent by the second device, where the first authentication message is generated by the second device by encrypting an encryption sequence according to the key;

decrypt the first authentication message according to the key to obtain the encryption sequence, and establish a secure channel between the first device and the second device according to the encryption sequence; and send a shared media content list of the first device to the second device on the secure channel according to a control instruction, so that the second device acquires the shared media content from the shared media content list.

With reference to the third aspect or any one of the first to sixth possible implementation manners of the third aspect, in a seventh possible implementation manner of the third aspect, the transceiver module is further configured to receive a private sharing mode configuration instruction sent by a user, and use the private sharing mode according to the instruction.

With reference to the third aspect or any one of the first to sixth possible implementation manners of the third aspect, in an eighth possible implementation manner of the third aspect, the apparatus further includes a first acquiring module, configured to, when the media content sharing apparatus accesses a wireless local area network WLAN, acquire a network identifier of the WLAN; where the processing module is further configured to determine, according to the network identifier, whether the WLAN is a public network, and if the WLAN is a public network, use the private sharing mode.

With reference to the third aspect or any one of the first to sixth possible implementation manners of the third aspect, in a ninth possible implementation manner of the third aspect, the apparatus further includes a second acquiring module, configured to, when the media content sharing apparatus accesses a WLAN, acquire a network identifier of the WLAN; where the processing module is further configured to: determine, according to the network identifier, whether the media content sharing apparatus accesses the WLAN for the first time;

if it is determined, according to the network identifier, that the media content sharing apparatus accesses the WLAN for the first time, generate prompt information to prompt the user whether to select the private sharing mode; and when the transceiver module receives selection information that is sent by the user according to the prompt information and the selection information includes the private sharing mode, use the private sharing mode.

With reference to the third aspect or any one of the first to sixth possible implementation manners of the third aspect, in a tenth possible implementation manner of the third aspect, the apparatus further includes a third acquiring module, configured to, when the media content sharing apparatus accesses a WLAN, acquire a network identifier of the WLAN; where the processing module is further configured to: find whether the network identifier and a medium access control MAC address of a wireless access point AP corresponding to the network identifier exist in an access point list; and if the network identifier and the MAC address of the AP corresponding to the network identifier exist in the access point list, use the private sharing mode.

According to a fourth aspect, an embodiment of the present invention provides a media content sharing apparatus, including:

a transceiver module, configured to acquire first private information sent by a first device, where the media content sharing apparatus currently uses a private sharing mode; and a processing module, configured to acquire shared media content of the first device according to the first private information.

With reference to the fourth aspect, in a first possible implementation manner of the fourth aspect, the transceiver module includes:

a near field communication unit, configured to establish the NFC channel with the first device, and receive, through the NFC channel, the first private information sent by the first device; or a Bluetooth processing unit, configured to establish a Bluetooth piconet with the first device, and receive, in the Bluetooth piconet, the first private information sent by the first device; or an image processing unit, configured to capture a two-dimensional code image displayed by the first device, and acquire the first private information of the first device, where the two-dimensional code image is a two-dimensional code image generated by the first device by encoding the first private information; or a sound wave processing unit, configured to receive, through a microphone, a sound wave signal propagated by the first device, and decode the sound wave signal to acquire the first private information of the first device, where the sound wave signal is a sound wave signal generated by the first device by encoding the first private information.

With reference to the fourth aspect or the first possible implementation manner of the fourth aspect, in a second possible implementation manner of the fourth aspect, the first private information is a private device description document uniform resource locator DDD URL of the first device and a private universally unique identifier UUID of the first device, and the transceiver module is configured to send a first request message to the first device, where the first request message carries the private DDD URL of the first device; and the transceiver module is configured to receive second private information sent by the first device, where the second private information includes a private device description document DDD corresponding to the private DDD URL of the first device, and the private DDD includes a private Service Control Protocol Description SCPD document URL of the first device; and the processing module is configured to acquire a corresponding private SCPD document from the first device according to the private SCPD document URL, and invoke a corresponding control instruction according to the private SCPD document, so that the first device sends a shared media content list of the first device according to the control instruction; and the processing module is further configured to acquire the shared media content from the shared media content list.

With reference to the second possible implementation manner of the fourth aspect, in a third possible implementation manner of the fourth aspect, the transceiver module is further configured to send a private DDD URL and UUID information of the media content sharing apparatus to the first device.

With reference to the fourth aspect or the first possible implementation manner of the fourth aspect, in a fourth possible implementation manner of the fourth aspect, the first private information is a private identifier of the first device; and the transceiver module is configured to receive the first private information sent by the first device, and the processing module directly accesses the first device according to the private identifier of the first device, and acquires the shared media content of the first device.

With reference to the fourth possible implementation manner of the fourth aspect, in a fifth possible implementation manner of the fourth aspect, the transceiver module is further configured to send a private identifier of the media content sharing apparatus to the first device.

With reference to the fourth aspect or the first possible implementation manner of the fourth aspect, in a sixth possible implementation manner of the fourth aspect, the first private information includes a key generated by the first device; and the transceiver module is configured to:

acquire the first private information sent or displayed by the first device, and generate a first authentication message by encrypting an encryption sequence according to the key;

send the first authentication message to the first device, so that the first device decrypts the first authentication message according to the key to obtain the encryption sequence, and establishes a secure channel with the second device according to the encryption sequence; and invoke a control instruction, acquire, through the secure channel, a shared media content list of the first device sent by the first device, and acquire the shared media content from the shared media content list.

With reference to the fourth aspect or any one of the first to sixth possible implementation manners of the fourth aspect, in a seventh possible implementation manner of the fourth aspect, the transceiver module is further configured to receive a private sharing mode instruction sent by a user, and the processing module uses the private sharing mode according to the instruction.

With reference to the fourth aspect or any one of the first to sixth possible implementation manners of the fourth aspect, in an eighth possible implementation manner of the fourth aspect, the apparatus further includes a first acquiring module, configured to, when a WLAN is accessed, acquire a network identifier of the WLAN; where the processing module is configured to determine, according to the network identifier, whether the WLAN is a public network, and if the WLAN is a public network, use the private sharing mode.

With reference to the fourth aspect or any one of the first to sixth possible implementation manners of the fourth aspect, in a ninth possible implementation manner of the fourth aspect, the apparatus further includes a second acquiring module, configured to, when a WLAN is accessed, acquire a network identifier of the WLAN; where the processing module is configured to: determine, according to the network identifier, whether the media content sharing apparatus accesses the WLAN for the first time; if it is determined, according to the network identifier, that the media content sharing apparatus accesses the WLAN for the first time, generate prompt information to prompt the user whether to select the private sharing mode; and when the transceiver module receives selection information that is sent by the user according to the prompt information and the selection information includes the private sharing mode, use the private sharing mode.

With reference to the fourth aspect or any one of the first to sixth possible implementation manners of the fourth aspect, in a tenth possible implementation manner of the fourth aspect, the apparatus further includes a third acquiring module, configured to, when a WLAN is accessed, acquire a network identifier of the WLAN; where the processing module is configured to: find whether the network identifier and a medium access control MAC address of a wireless access point AP corresponding to the network identifier exist in an access point list; and if the network identifier and the MAC address of the wireless access point AP corresponding to the network identifier exist in the access point list, use the private sharing mode.

According to a fifth aspect, an embodiment of the present invention provides a terminal device, including:

a processor, configured to set the terminal device to a private sharing mode, and acquire first private information corresponding to the private sharing mode; and a transceiver module, configured to send or display the first private information to another terminal device, so that the another terminal device acquires the first private information and acquires shared media content of the terminal device according to the first private information.

With reference to the fifth aspect, in a first possible implementation manner of the fifth aspect, the transceiver module specifically includes:

a near field communication NFC transmitter, configured to establish an NFC channel with the another terminal device, and send the first private information to the another terminal device through the NFC channel; or a Bluetooth transmitter, configured to establish a Bluetooth piconet with the another terminal device, and send first private information to the another terminal device in the Bluetooth piconet; or an image encoder, configured to encode the first private information to generate a two-dimensional code image, and display, through a display, the first private information corresponding to the two-dimensional code image form, so that the another terminal device captures the two-dimensional code image and acquires the first private information; or a sound encoder, configured to encode the first private information to generate a sound wave signal, and propagate the sound wave signal through a speaker, so that the another terminal device receives the sound wave signal through a microphone and acquires the first private information by decoding the sound wave signal.

With reference to the fifth aspect or the first possible implementation manner of the fifth aspect, in a second possible implementation manner of the fifth aspect, the first private information includes a private device description document uniform resource locator DDD URL of the terminal device and a private universally unique identifier UUID of the terminal device; and the transceiver module is specifically configured to:

send or display the first private information to the another terminal device, and receive a first request message sent by the another terminal device, where the first request message carries the private DDD URL of the terminal device;

send second private information to the another terminal device according to the first request message, where the second private information includes a private device description document DDD corresponding to the private DDD URL, and the private DDD includes a private Service Control Protocol Description SCPD document URL of the terminal device, so that the another terminal device acquires a corresponding private SCPD document according to the private SCPD document URL and invokes a corresponding control instruction according to the private SCPD document; and send a shared media content list of the terminal device to the another terminal device according to the control instruction, so that the another terminal device acquires the shared media content from the shared media content list, where the control instruction is an instruction invoked by the another terminal device according to the private SCPD document.

With reference to the fifth aspect or the first possible implementation manner of the fifth aspect, in a third possible implementation manner of the fifth aspect, the first private information is a private identifier of the terminal device; and the transceiver module is specifically configured to:

send or display the first private information to the another terminal device, so that the another terminal device directly accesses the terminal device according to the private identifier of the terminal device and acquires the shared media content of the terminal device.

With reference to the fifth aspect or the first possible implementation manner of the fifth aspect, in a fourth possible implementation manner of the fifth aspect, the first private information includes a key generated by the terminal device, and the transceiver module is configured to send the first private information to the another terminal device, and receive a first authentication message sent by the another terminal device, where the first authentication message is generated by the another terminal device by encrypting an encryption sequence according to the key;

the processor is configured to decrypt the first authentication message according to the key to obtain the encryption sequence, and establish a secure channel between the terminal device and the another terminal device according to the encryption sequence; and the transceiver module is further configured to send a shared media content list of the terminal device to the another terminal device on the secure channel according to a control instruction, so that the another terminal device acquires the shared media content from the shared media content list.

With reference to the fifth aspect or any one of the first to fourth possible implementation manners of the fifth aspect, in a fifth possible implementation manner of the fifth aspect, the transceiver module is further configured to acquire first private information of the another terminal device sent or displayed by the another terminal device.

With reference to the fifth aspect or any one of the first to fifth possible implementation manners of the fifth aspect, in a sixth possible implementation manner of the fifth aspect, the processor is further configured to:

access a wireless local area network WLAN and acquire a network identifier of the WLAN;

determine, according to the network identifier, whether the WLAN is a public network; and if the WLAN is a public network, use the private sharing mode.

With reference to the fifth aspect or any one of the first to fifth possible implementation manners of the fifth aspect, in a seventh possible implementation manner of the fifth aspect, the processor is further configured to:

access a WLAN and acquire a network identifier of the WLAN;

determine, according to the network identifier, whether the terminal device accesses the WLAN for the first time;

if it is determined, according to the network identifier, that the WLAN is the WLAN that is accessed by the terminal device for the first time, generate prompt information to prompt the user whether to select the private sharing mode; and when the transceiver module receives selection information that is sent by the user according to the prompt information and the selection information includes the private sharing mode, use the private sharing mode.

With reference to the fifth aspect or any one of the first to fifth possible implementation manners of the fifth aspect, in an eighth possible implementation manner of the fifth aspect, the processor is further configured to:

access a WLAN and acquire a network identifier of the WLAN;

find whether the network identifier and a medium access control MAC address of a wireless access point AP corresponding to the network identifier exist in an access point list; and if the network identifier and the MAC address of the AP corresponding to the network identifier exist in the access point list, use the private sharing mode.

According to a sixth aspect, an embodiment of the present invention provides a terminal device, including:

a transceiver module, configured to acquire first private information sent or displayed by another terminal device; and a processor, configured to set the ten Anal device to a private sharing mode currently; where the transceiver module is further configured to acquire shared media content of the another terminal device according to the first private information.

With reference to the sixth aspect, in a first possible implementation manner of the sixth aspect, the transceiver module includes:

a near field communication NFC transmitter, configured to establish an NFC channel with the another terminal device, and receive, through the NFC channel, the first private information sent by the another terminal device; or a Bluetooth transmitter, configured to establish a Bluetooth piconet with the another terminal device, and receive, in the Bluetooth piconet, the first private information sent by the another terminal device; or a camera, configured to capture a two-dimensional code image displayed by the another terminal device, and acquire the first private information of the another terminal device, where the two-dimensional code image is a two-dimensional code image generated by the another terminal device by encoding the first private information; or a sound wave decoder, configured to receive, through a sound collecting module, a sound wave signal propagated by the another terminal device, and decode the sound wave signal to acquire the first private information of the another terminal device, where the sound wave signal is a sound wave signal generated by the another terminal device by encoding the first private information.

With reference to the sixth aspect or the first possible implementation manner of the sixth aspect, in a second possible implementation manner of the sixth aspect, the first private information includes a private device description document uniform resource locator DDD URL of the another terminal device and a private universally unique identifier UUID of the another terminal device; and the transceiver module is specifically configured to:

send a first request message to the another terminal device, where the first request message carries the private DDD URL of the another terminal device;

receive second private information sent by the another terminal device, where the second private information includes a private device description document DDD corresponding to the private DDD URL of the another terminal device, and the private DDD includes a private Service Control Protocol Description SCPD document URL of the another terminal device;

acquire a corresponding private SCPD document from the another terminal device according to the private SCPD document URL, and invoke a corresponding control instruction according to the private SCPD document, so that the another terminal device sends a shared media content list of the another terminal device according to the control instruction; and acquire the shared media content from the shared media content list.

With reference to the sixth aspect or the first possible implementation manner of the sixth aspect, in a third possible implementation manner of the sixth aspect, the first private information is a private identifier of the another terminal device; and the transceiver module is specifically configured to:

acquire the first private information sent by the another terminal device, directly access the another terminal device according to the private local domain name of the another terminal device, and acquire the shared media content of the another terminal device.

With reference to the sixth aspect or the first possible implementation manner of the sixth aspect, in a fourth possible implementation manner of the sixth aspect, the first private information includes a key generated by the another terminal device; and the transceiver module is specifically configured to:

acquire the first private information sent or displayed by the another terminal device, and generate a first authentication message by encrypting an encryption sequence according to the key;

send the first authentication message to the another terminal device, so that the another terminal device decrypts the first authentication message according to the key to obtain the encryption sequence, and establishes a secure channel with the terminal device according to the encryption sequence; and invoke a control instruction, acquire, through the secure channel, a shared media content list of the another terminal device sent by the another terminal device, and acquire the shared media content from the shared media content list.

With reference to the sixth aspect or any one of the first to fourth possible implementation manners of the sixth aspect, in a fifth possible implementation manner of the sixth aspect, the transceiver module is further configured to send or display first private information of the terminal device to the another terminal device.

With reference to the sixth aspect or any one of the first to fifth possible implementation manners of the sixth aspect, in a sixth possible implementation manner of the sixth aspect, the processor is specifically configured to:

access a WLAN and acquire a network identifier of the WLAN;

determine, according to the network identifier, whether the WLAN is a public network; and if the WLAN is a public network, use the private sharing mode.

With reference to the sixth aspect or any one of the first to fifth possible implementation manners of the sixth aspect, in a seventh possible implementation manner of the sixth aspect, the processor is specifically configured to:

access a WLAN and acquire a network identifier of the WLAN;

determine, according to the network identifier, whether the terminal device accesses the WLAN for the first time;

if it is determined, according to the network identifier, that the terminal device accesses the WLAN for the first time, generate prompt information to prompt the user whether to select the private sharing mode; and when the transceiver module receives selection information that is sent by the user according to the prompt information and the selection information includes the private sharing mode, use the private sharing mode.

With reference to the sixth aspect or any one of the first to fifth possible implementation manners of the sixth aspect, in an eighth possible implementation manner of the sixth aspect, the processor is specifically configured to:

access a WLAN and acquire a network identifier of the WLAN;

find whether the network identifier and a medium access control MAC address of a wireless access point AP corresponding to the network identifier exist in an access point list; and if the network identifier and the MAC address of the wireless access point AP corresponding to the network identifier exist in the access point list, use the private sharing mode.

According to the media content sharing method and apparatus provided in the embodiments of the present invention, DLNA devices, namely, a first device and a second device, use a private sharing mode, and the first device generates first private information corresponding to the private mode, and sends the first private information to the second device, so that the second device acquires shared media content of the first device according to the first private information. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
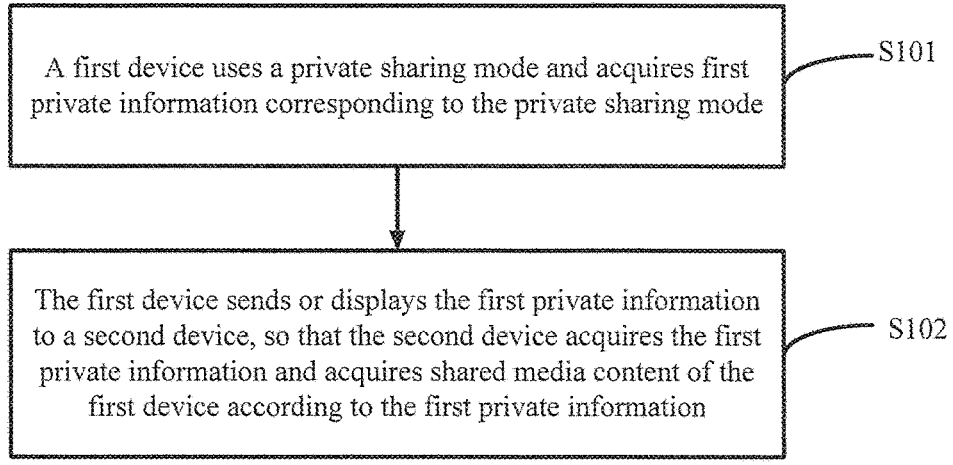
FIG. 1 is a flowchart of Embodiment 1 of a media content sharing method according to the present invention.

FIG. 1 is a flowchart of Embodiment 1 of a media content sharing method according to the present invention. This embodiment provides a secure and efficient media content sharing method applied to mobile devices having a DLNA function in a WLAN network environment. The involved mobile devices include mobile electronic devices such as a smartphone, a tablet computer, a digital camera, and a portable computer. An application program having the DLNA function is installed on these devices. As shown in FIG. 1, specific steps are as follows:

S101. A first device uses a private sharing mode and acquires first private information corresponding to the private sharing mode.

In this embodiment, after the first device and a second device access a WLAN network, when the first device and the second device need to perform private sharing in the public WLAN network, the first device and the second device need to use the private sharing mode, and the first device generates the first private information corresponding to the private sharing mode.

S102. The first device sends or displays the first private information to the second device, so that the second device acquires the first private information and acquires shared media content of the first device according to the first private information.

In this embodiment, in the private sharing mode, the first device and the second device discover each other by using the first private information sent or displayed by the first device; and the second device acquires the first private information, and may acquire, according to the first private information, shared media content to be shared by the first device.

The first device is not limited to one device, and may be multiple mobile devices, and the shared media content of the first device may also be acquired securely by performing the foregoing steps.

According to the media content sharing method provided in this embodiment, DLNA devices, namely, a first device and a second device, use a private sharing mode, and the first device acquires first private information corresponding to the private mode, and sends or displays the first private information to the second device, so that the second device acquires shared media content of the first device according to the first private information. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

In Embodiment 2 of the media content sharing method according to the present invention, on a basis of the foregoing embodiment shown in FIG. 1, that the first device sends the first private information to the second device in step S102 specifically includes the following implementation manners:

In a first implementation manner, the first device uses a near field communication (Near Field Communication, NFC for short) mode, establishes an NFC channel with the second device, and sends the first private information to the second device through the NFC channel.

In this implementation manner, both the first device and the second device are equipped with an NFC communication chip, and may implement communication with each other by using an NFC function module. If the first device uses the private sharing mode, the first device is triggered to generate radio frequency coupling through the equipped NFC communication chip with the NFC communication chip equipped in the second device, to establish the NFC channel with the second device. In addition, the first private information may be encapsulated in a transmission packet generated by the NFC communication chip, and sent to the second device through the NFC channel. Alternatively, the first private information may be encapsulated in a Simple Service Discovery Protocol (Simple Service Discovery Protocol, SSDP for short) packet, and an encapsulated SSDP packet is transmitted in the NFC mode.

In a second implementation manner, the first device uses a Bluetooth mode, establishes a Bluetooth piconet with the second device, and sends the first private information to the second device in the Bluetooth piconet.

In this implementation manner, both the first device and the second device are equipped with a Bluetooth module. When establishing the Bluetooth piconet, the first device and the second device need to perform device discovery and device pairing with each other, which needs to be set by a user autonomously. After the pairing is agreed, a connection is established and the Bluetooth piconet is formed. The first device sends the first private information to the second device through the Bluetooth piconet.

In a third implementation manner, the first device encodes the first private information to generate a two-dimensional code image, and displays the two-dimensional code image, so that the second device captures the two-dimensional code image and acquires the first private information.

In this implementation manner, the first device encodes the first private information to generate the two-dimensional code image for displaying; the second device is equipped with a camera or another image acquiring apparatus, and has an information processing function; and by using the camera or another image acquiring apparatus, the second device captures a two-dimensional code displayed by the first device, and acquires the first private information.

In a fourth implementation manner, the first device encodes the first private information to generate a sound wave signal, and propagates the sound wave signal, so that the second device receives the sound wave signal through a microphone and acquires the first private information by decoding the sound wave signal.

In this implementation manner, the first device encodes the acquired first private information to generate the sound wave signal, and propagates the sound wave signal through a speaker; and a user turns on the microphone of the second device to receive the sound wave signal and perform decoding to acquire the first private information.

Figure 2:
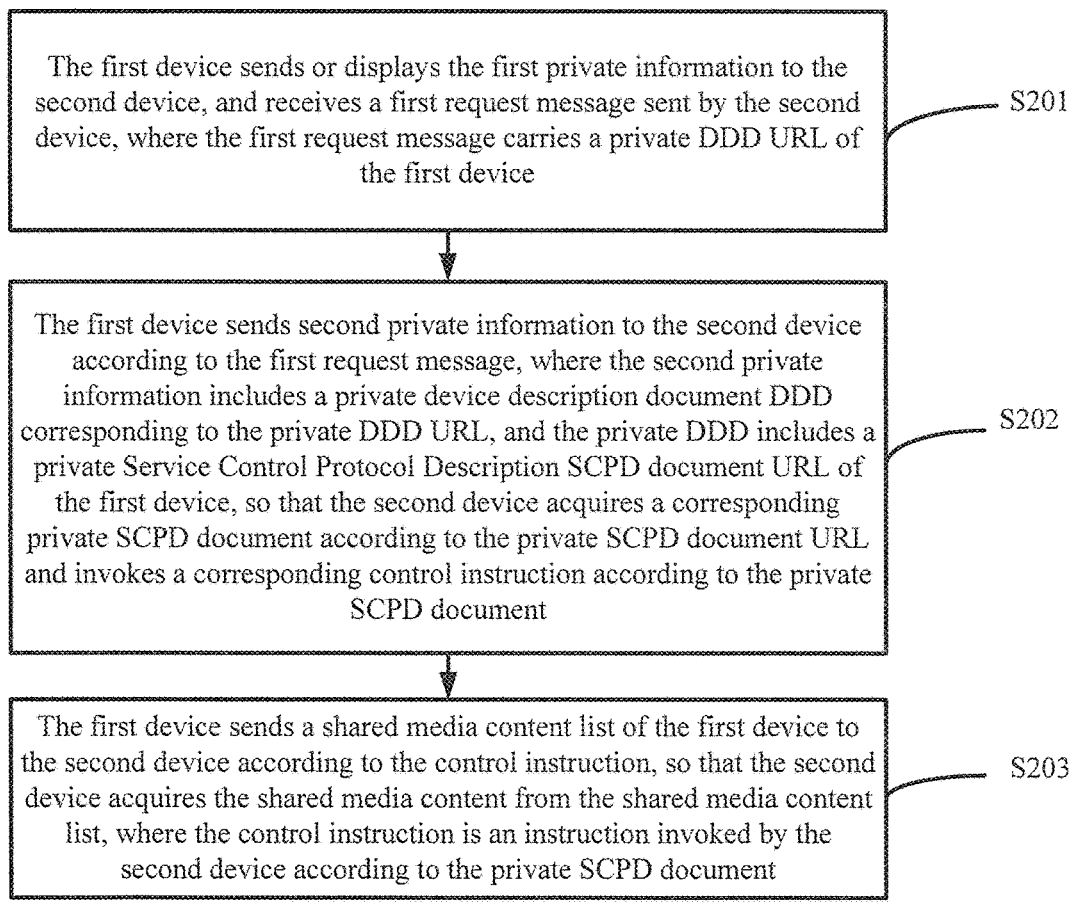
FIG. 2 is a flowchart of Embodiment 3 of a media content sharing method according to the present invention.

FIG. 2 is a flowchart of Embodiment 3 of a media content sharing method according to the present invention. On a basis of the foregoing embodiment shown in FIG. 1, as shown in FIG. 2, when the first private information is a private device description document uniform resource locator (Device Description Document Universal Resource Locator, DDD URL for short) and a universally unique identifier (Universally Unique Identifier, UUID for short) of the first device, S102 in the embodiment shown in FIG. 1 specifically includes:

S201. The first device sends or displays the first private information to the second device, and receives a first request message sent by the second device, where the first request message carries the private DDD URL of the first device.

In this embodiment, before the first device sends the first private information to the second device, both the first device and the second device multicast a Simple Service Discovery Protocol (Simple Service Discovery Protocol, SSDP for short) online message to a WLAN network after they access the WLAN network, to notify that both the first device and the second device are DLNA devices and access the WLAN network and are in an online state. When the WLAN network is a public WLAN network and the first device and the second device need to perform private sharing in the public WLAN network, the first device and the second device may use a private sharing mode, and meanwhile, each send an SSDP byebye message in a multicast manner to the WLAN network to notify that the first device and the second device have left the WLAN network. Then the first device sends the first private information to the second device. The first device receives a Hypertext Transfer Protocol (Hyper-text transfer protocol, HTTP for short) GET request that carries the private DDD URL of the first device and is sent by the second device to the first device corresponding to the private UUID, where the second device requests a private DDD document of the first device from the first device according to the private DDD URL of the first device.

S202. The first device sends second private information to the second device according to the first request message, where the second private information includes a private device description document DDD corresponding to the private DDD URL, and the private DDD includes a private Service Control Protocol Description (Service Control Protocol Description, SCPD for short) document URL of the first device, so that the second device acquires a corresponding private SCPD document according to the private SCPD document URL and invokes a corresponding control instruction according to the private SCPD document.

S203. The first device sends a shared media content list of the first device to the second device according to the control instruction, so that the second device acquires the shared media content from the shared media content list, where the control instruction is an instruction invoked by the second device according to the private SCPD document.

In this embodiment, after acquiring the private DDD of the first device, the second device may acquire a private SCPD document of a corresponding server by using <SCPD URL>, and then acquire a related control command (action) and a corresponding parameter variable of the service; and may invoke the corresponding action by using <controlURL> and complete a corresponding function. For example, if both the first device and the second device are a smartphone, the second device may invoke a "CDS:: Browse( )/Search( )" command from the first device (in a specific implementation manner, the command is mainly used to acquire a shared media content list; the command is set differently in difference devices; and a specific command format is not specifically limited in the present invention), so that the first device returns the shared media content list to the second device. After acquiring the shared media content list of the first device, the second device may acquire the shared media content of the first device by clicking, for example, a shared picture, so that shared media content stored in the first device can be shared with the second device.

Optionally, after sending the first private information to the second device, the first device receives a private DDD URL and UUID information of the second device sent by the second device.

The first device receives the private DDD URL and the UUID information sent by the second device, which are included with the private DDD URL and UUID information of the first device in the first private information when the first device establishes a connection to another third device, and sent to the third device, so that the second device directly establishes a connection to the third device, thereby reducing a processing process when multiple devices share media content mutually.

According to the media content sharing method provided in this embodiment, a first device sends first private information to a second device, and sends second private information to the second device according to a first request message received from the second device, so that the second device acquires a corresponding private SCPD document and invokes a corresponding control instruction according to the private SCPD document; and the first device sends a shared media content list to the second device according to the control instruction, so that the second device acquires shared media content from the shared media content list. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

Figure 3:
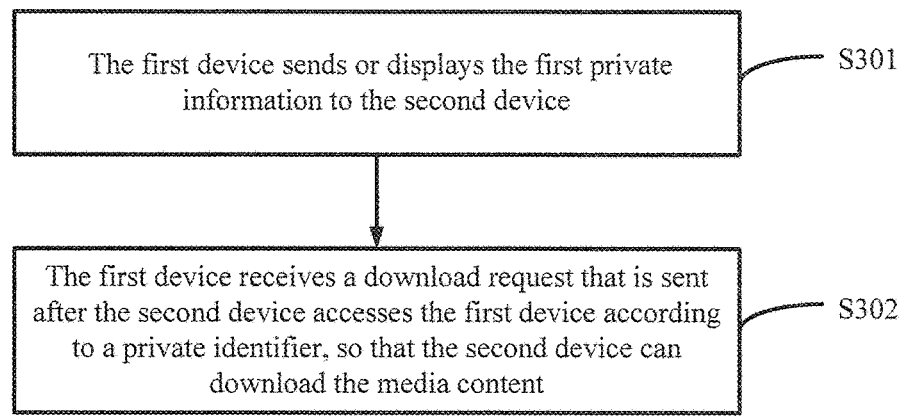
FIG. 3 is a flowchart of Embodiment 4 of a media content sharing method according to the present invention.

FIG. 3 is a flowchart of Embodiment 4 of a media content sharing method according to the present invention. As shown in FIG. 3, in Embodiment 4 of the media content sharing method according to the present invention, on a basis of the foregoing embodiment shown in FIG. 1, when the first private information is a private identifier of the first device, S102 in the embodiment shown in FIG. 1 specifically includes:

S301. The first device sends or displays the first private information to the second device.

In this embodiment, the private information is the private identifier of the first device, so that the second device directly accesses the first device according to the private identifier of the first device and acquires the shared media content of the first device.

S302. The first device receives a download request that is sent after the second device accesses the first device according to the private identifier, so that the second device can download the media content.

In this embodiment, when a private identifier sent or displayed mainly for devices having a private media sharing solution, for example, between various mobile devices, is a private access website, the second device directly accesses the private identifier, and downloads and acquires required media content from the first device.

Optionally, after the first device sends or displays the first private information to the second device, the first device acquires first private information of the second device sent or displayed by the second device.

According to the media content sharing method provided in this embodiment, a first device sends first private information, namely, a private identifier, to a second device, so that the second device directly accesses the private identifier to acquire shared media content. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

Figure 4:
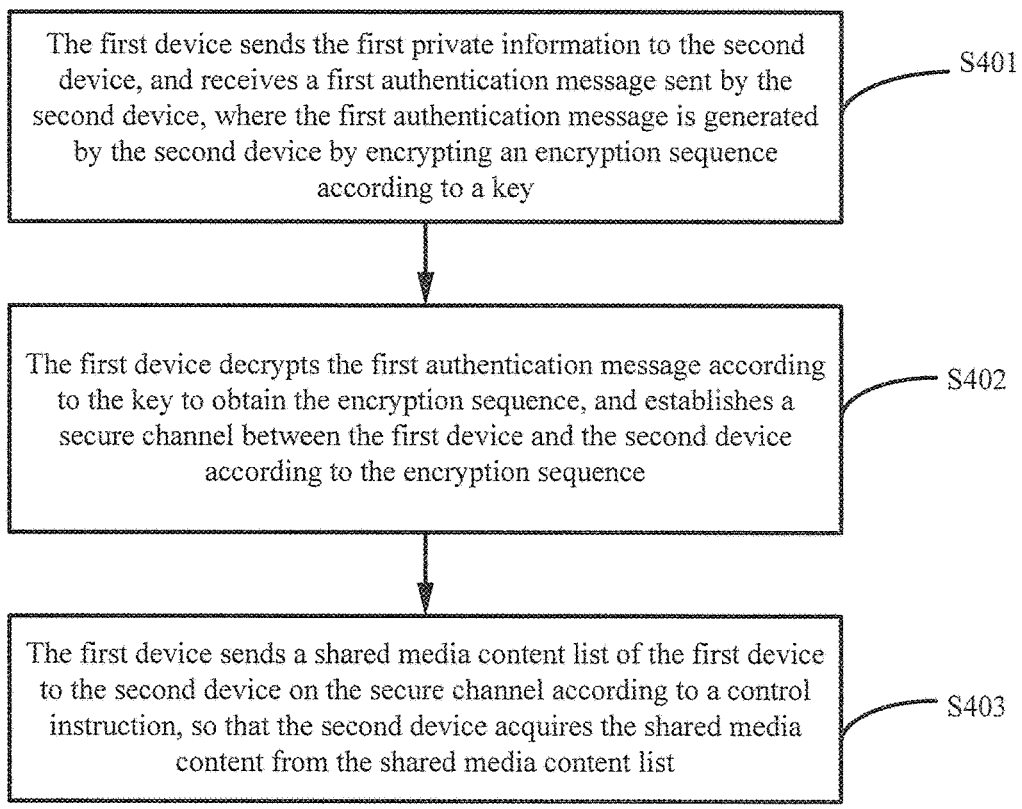
FIG. 4 is a flowchart of Embodiment 5 of a media content sharing method according to the present invention.

FIG. 4 is a flowchart of Embodiment 5 of a media content sharing method according to the present invention. As shown in FIG. 4, in Embodiment 5 of the media content sharing method according to the present invention, on a basis of the foregoing embodiment shown in FIG. 1, when the first private information includes a key generated by the first device, an implementation manner of S102 in the embodiment shown in FIG. 1 is as follows:

S401. The first device sends the first private information to the second device, and receives a first authentication message sent by the second device, where the first authentication message is generated by the second device by encrypting an encryption sequence according to the key.

S402. The first device decrypts the first authentication message according to the key to obtain the encryption sequence, and establishes a secure channel between the first device and the second device according to the encryption sequence.

S403. The first device sends a shared media content list of the first device to the second device on the secure channel according to a control instruction, so that the second device acquires the shared media content from the shared media content list.

In this embodiment, the first device sends the key to the second device, so that the second device randomly generates an encryption sequence code, which is used to encrypt all documents transmitted between the first device and the second device; the second device encrypts the encryption sequence code according to the key to generate the first authentication message, and returns the first authentication message to the first device; and the first device acquires the first authentication message, and decrypts the first authentication message to obtain the encryption sequence code, and establishes the secure channel with the second device according to the encryption sequence code. All data exchanged between the first device and the second device in a processing process is encrypted by using the encryption sequence code.

According to the media content sharing method provided in this embodiment, a first device sends first private information, namely, a private key, to a second device, so that the second device generates an encryption sequence code and returns the encryption sequence code to the first device; and the first device establishes a secure channel with the second device, and shared media content is acquired through the secure channel. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

Figure 5:
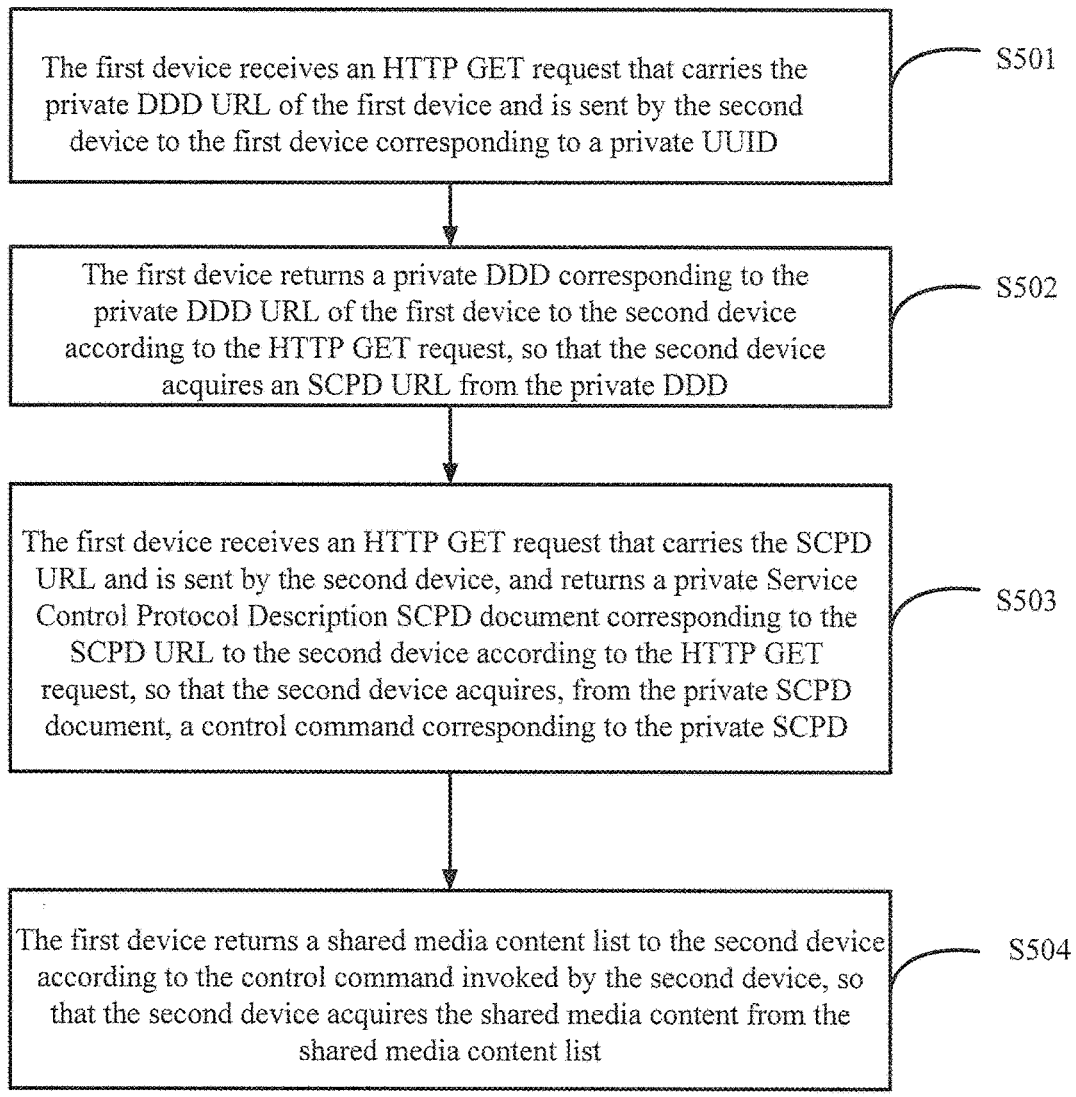
FIG. 5 is a flowchart of Embodiment 6 of a media content sharing method according to the present invention.

FIG. 5 is a flowchart of Embodiment 6 of a media content sharing method according to the present invention. On a basis of the foregoing embodiment shown in FIG. 2, an example is used in the following to describe specific implementation of the media content sharing method according to the present invention. When the first private information is the private DDD URL and the UUID of the first device, as shown in FIG. 5, specific steps are as follows:

S501. The first device receives an HTTP GET request that carries the private DDD URL of the first device and is sent by the second device to the first device corresponding to the private UUID.

In this embodiment, the second device requests a private DDD document of the first device from the first device according to the private DDD URL of the first device. For example, the private DDD URL of the first device is: http://10.11.84.153:upnpdevicescription/friendsharing. In this case, packet information of the HTTP GET request that carries the private DDD URL of the first device and is sent by the second device to the first device corresponding to the private UUID may be:

```
"GET /upnpdevicedescription/friendsharing HTTP/1.1
Cache-Control: no-cache
Connection: Close
Pragma: no-cache
Accept: text/xml, application/xml
Host: 10.11.84.153:7050
User-Agent:Microsoft-Windows/6.1UPnP/1.0Windows-Media-Player/12.0.7601.1751 4 DLNADOC/1.50
    (MS-DeviceCaps/1024)"
```

S502. The first device returns a private DDD corresponding to the private DDD URL of the first device to the second device according to the HTTP GET request, so that the second device acquires a Service Control Protocol Description uniform resource locator (Service Control Protocol Description URL, SCPD URL for short) from the private DDD.

S503. The first device receives an HTTP GET request that carries the SCPD URL and is sent by the second device, and returns a private Service Control Protocol Description SCPD document corresponding to the SCPD URL to the second device according to the HTTP GET request, so that the second device acquires, from the private SCPD document, a control command corresponding to the private SCPD.

In this embodiment, after receiving the HTTP GET request, the first device sends its private DDD to the second device. Its specific format may be:

S504. The first device returns a shared media content list to the second device according to the control command invoked by the second device, so that the second device acquires the shared media content from the shared media content list.

In this embodiment, after acquiring the private DDD of the first device, the second device may acquire a private SCPD document of a corresponding server by using <SCPD URL>, and then acquire a related control command (action) and a corresponding parameter variable of the service; and

```
"<?xml version="1.0" encoding="UTF-8"?>
<root xmlns="urn:schemas-upnp-org:device-1-0"
xmlns:dlna="urn:schemas-dlna-org:device-1-0">
  <specVersion>
  <major>1</major>
  <minor>0</minor>
  </specVersion>
  <device>
  <deviceType>urn:schemas-upnp-org:device:MediaServer:1</deviceType>
  <friendlyName>HUAWEI-D2</friendlyName>
  <manufacturer>HUAWEI</manufacturer>
  <UDN>uuid:d1578360-feb3-1167-1000-2c27d742936c</UDN>
  <presentationURL>http://10.11.84.153/</presentationURL>
  <dlna:X_DLNADOC
xmlns:dlna="urn:schemas-dlna-org:device-1-0">DMS-1.50</dlna:X_DLNADOC>
  <iconList>...</iconList>
  <serviceList>
  <service>
  <serviceType>urn:microsoft.com:service:X_MS_MediaReceiverRegistrar:1</service
Type>
    <serviceId>urn:microsoft.com:serviceId:X_MS_MediaReceiverRegistrar</serviceId>
    <SCPDURL>/X_MS_MediaReceiverRegistrar/scpd.xml</SCPDURL>
    <controlURL>/X_MS_MediaReceiverRegistrar/control.xml</controlURL>
    <eventSubURL>/X_MS_MediaReceiverRegistrar/event.xml</eventSubURL>
    </service>
    <service>
    <serviceType>urn:schemas-upnp-org:service:ContentDirectory:1</serviceType>
    <serviceId>urn:upnp-org:serviceId:ContentDirectory</serviceId>
    <SCPDURL>/ContentDirectory/scpd.xml</SCPDURL>
    <controlURL>/ContentDirectory/control.xml</controlURL>
    <eventSubURL>/ContentDirectory/event.xml</eventSubURL>
    </service>
    <service>
    <serviceType>urn:schemas-upnp-org:service:ConnectionManager:1</serviceType>
    <serviceId>urn:upnp-org:serviceId:ConnectionManager</serviceId>
    <SCPDURL>/ConnectionManager/scpd.xml</SCPDURL>
    <controlURL>/ConnectionManager/control.xml</controlURL>
    <eventSubURL>/ConnectionManager/event.xml</eventSubURL>
    </service>
    </serviceList>
    </device>
    </root>"
```

In this embodiment, as may be seen from the private DDD, the DDD includes basic description information such as a device type <deviceType>, a device name <friendlyName>, a device manufacturer <manufacturer>, and a device identifier <UDN>, where a device UUID in a device identifier field is a private device UUID of the first device. In addition, the DDD further includes service (service) information supported by the device. As may be seen from the DDD, the first device supports three services: X_MS_MediaReceiverRegistrar, ContentDirectory, and ConnectionManager. Each service is corresponding to three addresses, namely, a description address <SCPDURL> used to indicate a URL of a service description document SCPD of the service, a control address <controlURL> used to indicate an address URL for invoking a corresponding control command (action) in the service, and an event address <eventURL> used to indicate an address URL for reporting an event message to a control point when parameters of some control commands in the service change.

may invoke the corresponding action by using <controlURL> and implement a corresponding function. For example, the second device invokes a CDS::Browse( )/Search( ) command from the first device, and the first device sends the shared media content list of the first device to the second device. After acquiring the shared media content list of the first device, the second device may acquire the shared media content of the first device by clicking, for example, a shared picture, so that shared media content stored in the first device can be shared with the second device.

Figure 6:
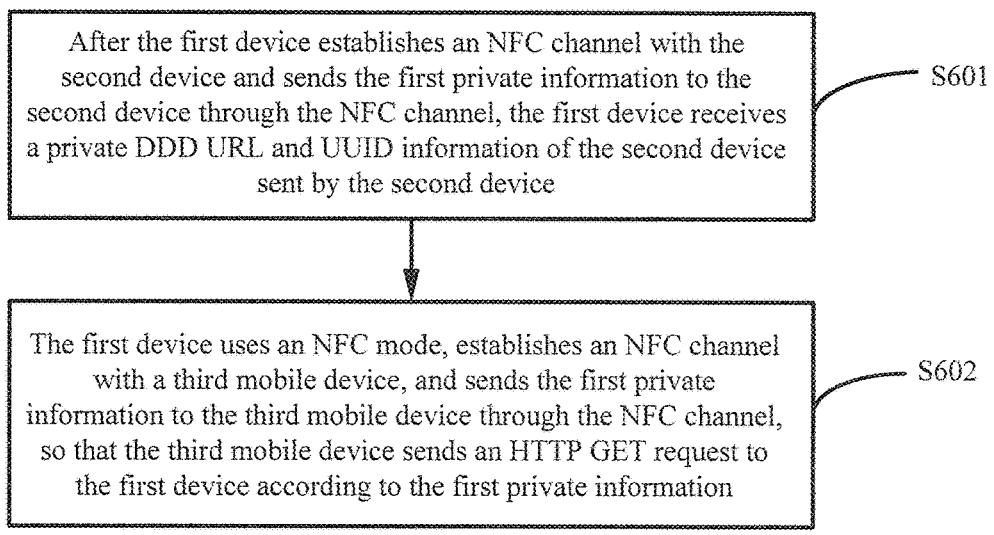
FIG. 6 is a flowchart of Embodiment 7 of a media content sharing method according to the present invention.

Optionally, FIG. 6 is a flowchart of Embodiment 7 of a media content sharing method according to the present invention. On a basis of the foregoing embodiment, after S502, the method may further include:

S601. After the first device establishes the NFC channel with the second device and sends the first private information to the second device through the NFC channel, the first device receives the private DDD URL and the UUID information of the second device sent by the second device.

In this embodiment, after the first device sends the first private information to the second device, the second device returns private information of the second device, namely, the private DDD URL and the UUID information of the second device, to the first device, so that the first private information that is sent after the first device establishes an NFC channel with another third device further includes the private DDD URL and the UUID information of the second device, so that the second device directly establishes a connection to the third device.

S602. The first device uses the NFC mode, establishes an NFC channel with a third device, and sends the first private information to the third device through the NFC channel, so that the third device sends an HTTP GET request to the first device according to the first private information.

In this embodiment, a manner of acquiring the shared media content by the third device is similar to a manner of acquiring the shared media content by the second device, and is not further described herein. Particularly, S602 is an optional step; and if there is no third device, this step may not be performed.

Further, in Embodiment 8 of the present invention, on a basis of the foregoing Embodiment 1, Embodiment 2, and Embodiment 3 shown in FIG. 1 and FIG. 2, that the first device uses the private sharing mode includes the following implementation manners:

In a first implementation manner, the first device receives a private sharing mode configuration instruction sent by a user, and uses the private sharing mode according to the instruction.

In this embodiment, when the WLAN network accessed by the first device and the second device is a public WLAN network and the first device and the second device need to perform private sharing in the public WLAN network, the first device may receive the private sharing mode instruction sent by the user, and use the private sharing mode according to the instruction.

In a second implementation manner, the first device accesses a wireless local area network WLAN and acquires a network identifier of the WLAN; and the first device determines, according to the network identifier, whether the WLAN is a public network, and if the WLAN is a public network, uses the private sharing mode.

In this embodiment, a service set identifier (Service Set Identifier, SSID for short) of a WLAN network may be decided by a wireless access point (Access Point, AP for short) forming the WLAN network. For example, an AP is deployed in a café at an airport to establish a WLAN network, and the AP broadcasts an SSID of the WLAN network periodically for capture and discovery by a mobile device. Generally, the SSID broadcast by the AP is a name of the WLAN network represented by the SSID.

In addition, an SSID of a network may be set by an AP. Generally, a name is set to a phrase or sentence that can represent a characteristic of a WLAN network. For example, using a WLAN network in a café at an airport as an example, an SSID of the WLAN network is Airport_cafe, which indicates that the WLAN is a wireless network located in the café at the airport. Alternatively, some WLAN networks are deployed by network operators, and their SSIDs may be set by using names of the network operators, for example, "China Unicorn" and "China Telecom". Therefore, a mobile device may determine, by using an SSID, whether an accessed WLAN network is a public network.

In this embodiment, it should be further noted that determining may be performed according to two factors: an encryption authentication mode and an SSID, that is, it may be determined that the WLAN network is a public WLAN network as long as the SSID is displayed as a public WLAN network or a WLAN for which no access password is set. Specifically, when access security of a whole network is considered, a private WLAN does not expect an unknown mobile device to access the WLAN network, and therefore, an access password is set. If an access device wants to access the WLAN network, the access device must input the access password and authentication must be successful. However, for a public WLAN network, a problem of access limitation is not considered, and therefore generally no access password is set; and an access device may access the WLAN as long as the access device discovers an SSID of the network. Therefore, whether a WLAN network is a public WLAN network may be determined according to whether an access password is set for the WLAN network; if an access password is set, the WLAN network is generally considered as a private network; and if no access password is set, the WLAN network is considered as a public network.

In a third implementation manner, the first access device accesses a WLAN and acquires a network identifier of the WLAN; the first device determines, according to the network identifier, whether the WLAN is a public network and whether the first device accesses the WLAN for the first time; if the first device determines, according to the network identifier, that the WLAN is a public network and the first device accesses the WLAN for the first time, the first device generates prompt information to prompt the user whether to select the private sharing mode; and when selection information that is sent by the user according to the prompt information is received and the selection information includes the private sharing mode, the first device uses the private sharing mode.

In this embodiment, the first device and the second device access a same WLAN network and acquire an SSID of the network, and start to detect whether the WLAN network is accessed for the first time. According to an existing WLAN network access module, after accessing a WLAN network, a mobile device automatically saves an SSID of the WLAN network and saves some access parameters of the WLAN network, for example, an access password, so that the mobile device can perform automatic discovery and automatic access after obtaining a signal of the WLAN network by means of search. Therefore, to determine whether the accessed WLAN network is accessed for the first time, it is only necessary to view the SSID of the accessed WLAN network saved in a record; if the SSID of the accessed WLAN network is not included in the record, it is considered that the WLAN network is accessed for the first time. After the mobile device accesses the WLAN network, the mobile device is triggered, according to an instruction clicked by the user, to enter a DLNA application program and automatically pop up an interface to prompt the user whether to select triggering of the private sharing mode. In addition, the user may also configure an entering mode. For example, after accessing a same WLAN network again, when the DLNA application program is started, the mobile device automatically sets a current mode to the private sharing mode or does not set a current mode to the private sharing mode. In this manner, the device does not need to multicast an SSDP online message to the public WLAN network.

In a fourth implementation manner, the first device accesses a WLAN and acquires a network identifier of the WLAN; the first device finds whether the network identifier and a medium access control MAC address of a wireless access point AP corresponding to the network identifier exist in an access point list; and if the network identifier and the MAC address of the AP corresponding to the network identifier exist in the access point list, the first device uses the private sharing mode.

In this embodiment, the first device accesses a private WLAN network, acquires an SSID of the WLAN network, and searches an access point list of the first device for a network identifier of the network and a MAC address of an AP corresponding to the network identifier; and if the network identifier and the AP corresponding to the network identifier exist in the access point list of the first device, the first device automatically sets a current mode to the private sharing mode.

The access point list records an SSID of a WLAN network when the first device selects to enter the private sharing mode after accessing a wireless local area network in a past period. The list is updated dynamically. A time threshold may be set. If a time interval from a previous access time exceeds the set time threshold, a network SSID in the access point list is deleted. In addition, if a new WLAN network is accessed and the user selects the private sharing mode when starting a DLNA application, the SSID is also added to the access point list. In this embodiment, for example, the access point list of the mobile device may be shown in Table 1.

TABLE 1

| Serial Number | Previous access time | Number of access times | SSID | MAC address |
| --- | --- | --- | --- | --- |
| 1 | 2013 Jul. 8 03:45:57 GMT | 5 | Starbucks | 00-0B-2F-19-D3-E0 |
| 2 | 2013 Jul. 5 08:10:46 GMT | 2 | Bob's home | A1-2E-25-6F-D9-AE |
| 3 | 2013 Jun. 26 02:10:37 GMT | 18 | China Telecom | 00-1B-21-B9-C3-64 |
| 4 | 2013 Jun. 11 07:18:10 GMT | 1 | Airport_cafe | 2C-27-D7-42-93-6C |

As shown in Table 1, Table 1 records network SSIDs and MAC addresses when the mobile device accesses networks and selects the private sharing mode within a period. For example, "Bob's home" in Table 1 indicates that the device selects to enter the private sharing mode when accessing the private WLAN network previously, and if the network is accessed again and the DLNA application program is started, the current mode is automatically set to the private sharing mode; if no record of the private WLAN network is found, when the DLNA application program is started, an SSDP online message is multicast to the whole WLAN network by default, and the user manually selects whether to set the current mode to the private sharing mode.

According to the media content sharing method provided in this embodiment, a first device sends or displays first private information to a second device, and sends second private information to the second device according to a first request message received from the second device, so that the second device acquires a corresponding private SCPD document and invokes a corresponding control instruction according to the private SCPD document; and the first device sends a shared media content list to the second device according to the control instruction, so that the second device acquires shared media content from the shared media content list. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

In Embodiment 9 of the media content sharing method according to the present invention, on a basis of the foregoing embodiment, an example is used in the following to describe specific implementation of the media content sharing method according to the present invention, where the first private information is a private identifier of the first device. After accessing a WLAN, the first device and the second device determine to use the private sharing mode to perform media content sharing, and the first device sends or displays a private identifier message packet to the second device.

A device discovery mechanism using a private identifier is different from that using an SSDP message format. An SSDP message carries a device DDD URL and device UUID information. A DDD document is acquired according to the DDD URL, so as to complete device discovery. The discovery mechanism using a private identifier is: for example, the first device encapsulates the private identifier in an NFC module, and stores the private identifier in a sending cache of the NFC module. For example, a packet of the private identifier is as follows:

John._airplay._tcp.local

As may be seen from the foregoing packet, the private identifier of the first device is John._airplay._tcp.local. Likewise, a private identifier of the second device may be an address domain name identifier, for example, "Alice._airplay._tcp.local" and "Bob._airplay._tcp.local". After generating and acquiring a first private information packet that includes a private identifier of a private local domain name of the first device, the first device sends the first private message to the second device, and the second device may directly access the private identifier of the private local domain name of the first device, and download the shared media content of the first device.

According to the media content sharing method provided in this embodiment, a first device sends first private information, namely, a private identifier, to a second device, so that the second device accesses the private identifier of the first device to acquire shared media content. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

Figure 7:
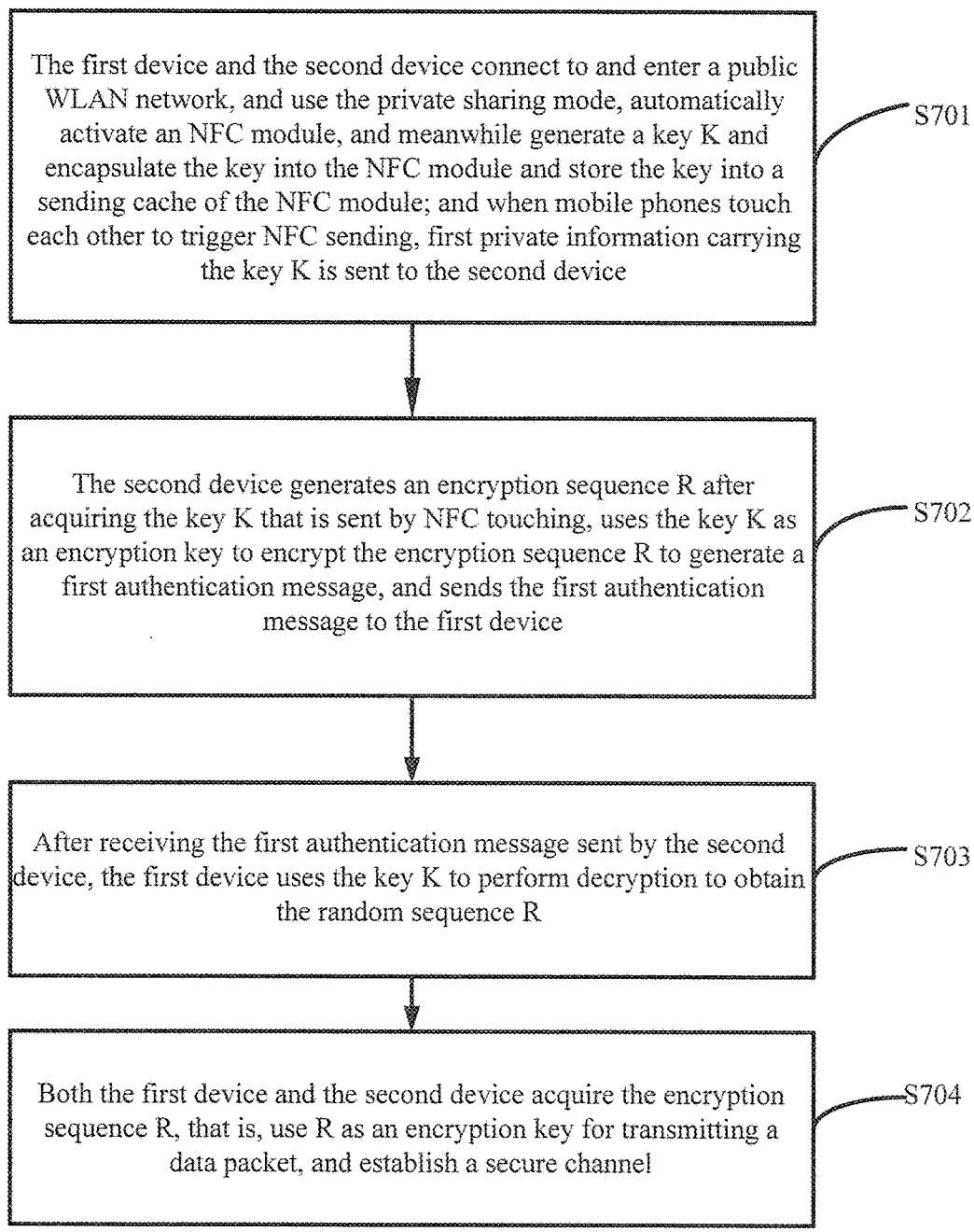
FIG. 7 is a flowchart of Embodiment 10 of a media content sharing method according to the present invention.

FIG. 7 is a flowchart of Embodiment 10 of a media content sharing method according to the present invention. As shown in FIG. 7, in Embodiment 10 of the media content sharing method according to the present invention, on a basis of the foregoing embodiment, an example is used in the following to describe specific implementation of the media content sharing method according to the present invention. In this embodiment, using NFC sending as an example, the first private information is a key generated by the first device, and specific steps of acquiring the shared media content by the second device from the first device are as follows:

S701. The first device and the second device connect to and enter a public WLAN network, use the private sharing mode, automatically activate an NFC module, and meanwhile generate a key K and encapsulate the key into the NFC module and store the key into a sending cache of the NFC module; and when mobile phones touch each other to trigger NFC sending, first private information carrying the key K is sent to the second device.

In this embodiment, before using the private sharing mode, the first device sends an SSDP:alive message to the second device or more DLNA devices in a broadcast manner, where the SSDP:alive message carries a DDD URL of a DMS1 and device UUID information. The key K is binary sequence code with a fixed length, and the key may be generated randomly or may be configured in an application program in advance. Optionally, the message may be sent in another manner in the foregoing embodiment.

S702. The second device generates an encryption sequence R after acquiring the key K that is sent by NFC touching, uses the key K as an encryption key to encrypt the encryption sequence R to generate a first authentication message, and sends the first authentication message to the first device.

A specific encryption process may be expressed as: first authentication message=E(R,K), where E( ) is referred to as an encryption operator and represents a specific encryption algorithm, including a DES algorithm, a 3DES algorithm, a TDEA algorithm, an IDEA algorithm, and the like. The specific encryption algorithm is not limited in the embodiment of the present invention. It should be noted that which encryption algorithm is used may be decided by the second device, or may be decided by the first device and the second device by means of negotiation.

S703. After receiving the first authentication message sent by the second device, the first device uses the key K to perform decryption to obtain the random sequence R.

S704. Both the first device and the second device acquire the encryption sequence R, that is, use R as an encryption key for transmitting a data packet, and establish a secure channel.

In this embodiment, after the secure channel is established, the second device may initiate a request to the first device, acquire a DDD document and an SCPD document corresponding to the first device, and acquire a media play list shared by the first device, and then acquire the shared media content. All data packets on the secure channel need to be encrypted by using the key R. For a specific acquiring process, reference may be made to the method in any one of the foregoing embodiments.

According to the media content sharing method provided in this embodiment, a first device sends first private information, namely, a key, to a second device, so that the second device generates an encryption sequence, encrypts the encryption sequence by using the key to generate a first authentication message, and returns the first authentication message to the first device; and the first device acquires the encryption sequence by means of decryption, and establishes a secure channel with the second device, so that the second device sends a request to acquire shared media content. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

Figure 8:
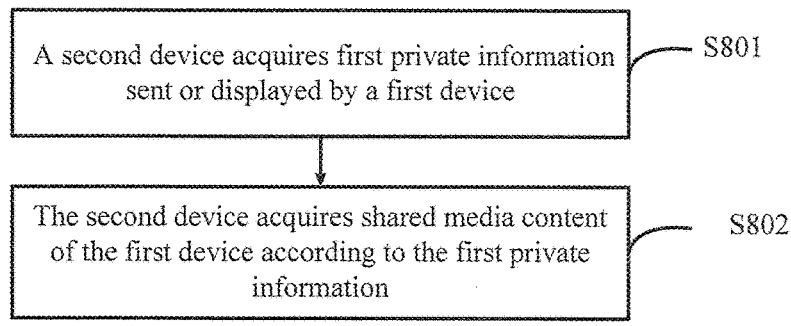
FIG. 8 is a flowchart of Embodiment 11 of a media content sharing method according to the present invention.

FIG. 8 is a flowchart of Embodiment 11 of a media content sharing method according to the present invention. As shown in FIG. 8, specific steps are as follows:

S801. A second device acquires first private information sent or displayed by a first device.

In this embodiment, after the first device and the second device access a WLAN network, when the first device and the second device need to perform private sharing in the public WLAN network, the first device and the second device need to use a private sharing mode, and the second device receives corresponding first private information sent by the first device.

S802. The second device acquires shared media content of the first device according to the first private information.

According to the media content sharing method provided in this embodiment, DLNA devices, namely, a first device and a second device, use a private sharing mode; and the second device receives first private information that is corresponding to the private mode and sent by the first device, and acquires shared media content of the first device according to the first private information. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

In Embodiment 12 of the media content sharing method according to the present invention, on a basis of the foregoing embodiment shown in FIG. 8, that the second device receives the first private information sent by the first device in step S801 specifically includes the following implementation manners:

In a first implementation manner, the second device uses a near field communication NFC mode, establishes the NFC channel with the first device, and receives, through the NFC channel, the first private information sent by the first device.

In this implementation manner, both the first device and the second device are equipped with an NFC communication chip, and may implement communication with each other by using an NFC function module. If the second device uses the private sharing mode, the second device is triggered to touch, through the equipped NFC communication chip, the NFC communication chip equipped in the first device, that is, the second device generates radio frequency coupling through the equipped NFC communication chip with the NFC communication chip equipped in the first device, to establish the NFC channel with the first device. In addition, the first device encapsulates the first private information in a transmission packet generated by the NFC communication chip, and sends the first private information to the second device through the NFC channel. Alternatively, the first device may encapsulate the first private information in a Simple Service Discovery Protocol (Simple Service Discovery Protocol, SSDP for short) packet, and transmits an encapsulated SSDP packet in the NFC mode.

In a second implementation manner, the second device uses a Bluetooth mode, establishes a Bluetooth piconet with the first device, and receives, in the Bluetooth piconet, the first private information sent by the first device.

In this implementation manner, both the second device and the first device are equipped with a Bluetooth module, but do not need to be equipped with an NFC chip. When establishing the Bluetooth piconet, the second device and the first device need to perform device discovery and device pairing with each other, which needs to be set by a user autonomously. After the pairing is agreed, a connection is established and the Bluetooth piconet is formed. The second device receives, through the Bluetooth piconet, the first private information sent by the first device.

In a third implementation manner, the second device captures a two-dimensional code image displayed by the first device, and acquires the first private information of the first device, where the two-dimensional code image is a two-dimensional code image generated by the first device by encoding the first private information.

In this implementation manner, the second device captures, by using a camera, the first private information sent by the first device, encodes the first private information to generate the two-dimensional code image, and processes the two-dimensional code image to acquire the first private information.

In a fourth implementation manner, the second device receives, through a microphone, a sound wave signal propagated by the first device, and decodes the sound wave signal to acquire the first private information of the first device, where the sound wave signal is a sound wave signal generated by the first device by encoding the first private information.

In this implementation manner, a user turns on the microphone of the second device, receives the sound wave signal that is generated by the first device by encoding the first private information in a software manner, and performs decoding to acquire the first private information.

Figure 9:
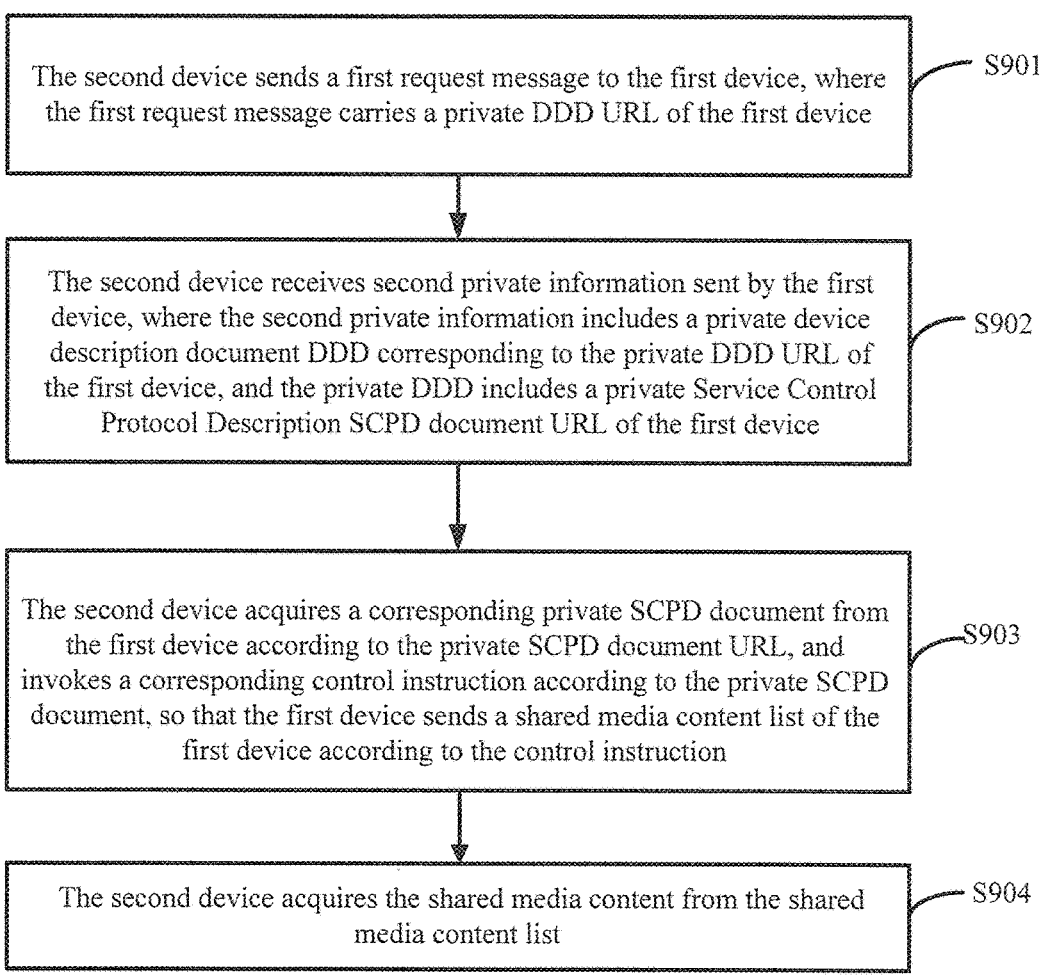
FIG. 9 is a flowchart of Embodiment 13 of a media content sharing method according to the present invention.

FIG. 9 is a flowchart of Embodiment 13 of a media content sharing method according to the present invention. On a basis of the embodiment shown in FIG. 8, as shown in FIG. 9, when the first private information is a private device description document uniform resource locator DDD URL of the first device and a private universally unique identifier UUID of the first device, a specific implementation manner of the media content sharing method is as follows:

S901. The second device sends a first request message to the first device, where the first request message carries the private DDD URL of the first device.

In this embodiment, the private DDD URL of the first device sent by the second device is used to acquire a private DDD of the first device.

S902. The second device receives second private information sent by the first device, where the second private information includes a private device description document DDD corresponding to the private DDD URL of the first device, and the private DDD includes a private Service Control Protocol Description SCPD document URL of the first device.

S903. The second device acquires a corresponding private SCPD document from the first device according to the private SCPD document URL, and invokes a corresponding control instruction according to the private SCPD document, so that the first device sends a shared media content list of the first device according to the control instruction.

In this embodiment, after acquiring the private DDD of the first device, the second device may acquire a private SCPD document of a corresponding server by using <SCPD URL>, and then acquire a related control command (action) and a corresponding parameter variable of the service; and may invoke the corresponding action by using <controlURL> and complete a corresponding function. For example, if the second device invokes a CDS:: Browse( )/Search( ) command from the first device, the first device sends the shared media content list of the first device to the second device.

S904. The second device acquires the shared media content from the shared media content list.

In this embodiment, after acquiring the shared media content list of the first device, the second device may acquire the shared media content of the first device by clicking, for example, a shared picture, so that shared media content stored in the first device can be shared with the second device.

According to the media content sharing method provided in this embodiment, a second device receives first private information sent by a first device, acquires a private DDD of the first device, and acquires a private SCPD document from the first device according to the DDD document, and invokes a corresponding control instruction to acquire a shared media content list from the first device and acquire shared media content. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

Figure 10:
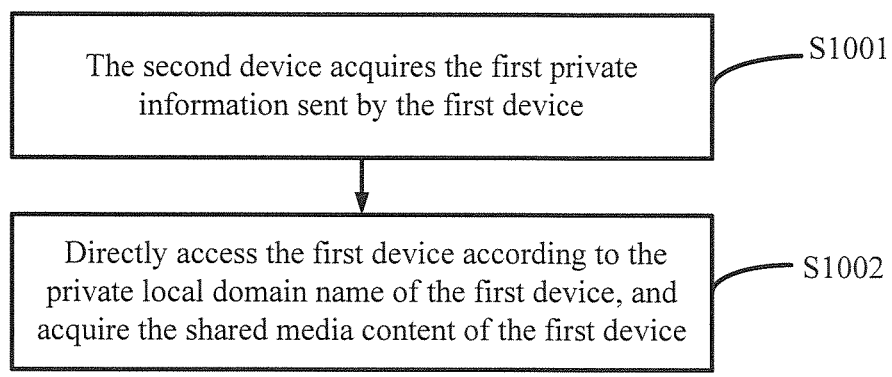
FIG. 10 is a flowchart of Embodiment 14 of a media content sharing method according to the present invention.

FIG. 10 is a flowchart of Embodiment 14 of a media content sharing method according to the present invention. As shown in FIG. 10, in Embodiment 14 of the media content sharing method according to the present invention, on a basis of the foregoing embodiment shown in FIG. 8, when the first private information is a private identifier of the first device, an implementation manner of S801 in the embodiment shown in FIG. 8 is as follows:

S1001. The second device acquires the first private information sent by the first device.

S1002. Directly access the first device according to the private local domain name of the first device, and acquire the shared media content of the first device.

In this embodiment, mainly for a device having a private media sharing solution, the first device sends the private identifier to the second device in a manner such as the NFC channel, or Bluetooth, or two-dimensional code, or sound wave signal. The second device receives the private identifier, directly accesses the private identifier, and downloads and acquires required media content.

According to the media content sharing method provided in this embodiment, a second device receives first private information, namely, a private identifier, sent by a first device, and the second device accesses the private identifier to acquire shared media content. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

In addition, the first private information may further include a key generated by the first device. Then, that the second device acquires the first private information, and acquires the shared media content of the first device according to the first private information includes: acquiring, by the second device, the first private information sent or displayed by the first device, and encrypting an encryption sequence according to the key to generate a first authentication message; sending, by the second device, the first authentication message to the first device, so that the first device decrypts the first authentication message according to the key to obtain the encryption sequence and establishes a secure channel with the second device according to the encryption sequence; and invoking, by the second device, a control instruction, acquiring, through the secure channel, a shared media content list of the first device sent by the first device, and acquiring the shared media content from the shared media content list.

For specific implementation manners of the foregoing Embodiment 13 and Embodiment 14, reference may be made to the process of the embodiment of the first device. The implementation methods, principles, and technical effects thereof are similar, and are not further described herein.

In Embodiment 15 of the present invention, on a basis of the foregoing embodiment, that the second device uses the private sharing mode includes the following implementation manners:

In a first implementation manner, the second device receives a private sharing mode instruction sent by a user, and uses the private sharing mode according to the instruction.

In this implementation manner, when a WLAN network accessed by the first device and the second device is a public WLAN network and the first device and the second device need to perform private sharing in the public WLAN network, the second device may receive the private sharing mode instruction sent by the user, and use the private sharing mode according to the instruction.

In a second implementation manner, the second device accesses a WLAN and acquires a network identifier of the WLAN; and the second device determines, according to the network identifier, whether the WLAN is a public network, and if the WLAN is a public network, uses the private sharing mode.

In this implementation manner, the second device determines, by using a network identifier, whether a network is a public network. A specific determining manner is the same as that of the first device.

In a third implementation manner, the second device accesses a WLAN and acquires a network identifier of the WLAN; the second device determines, according to the network identifier, whether the second device accesses the WLAN for the first time; and if the second device determines, according to the network identifier, that the second device accesses the WLAN for the first time, the second device generates prompt information to prompt the user whether to select the private sharing mode; and when selection information that is sent by the user according to the prompt information is received and the selection information includes the private sharing mode, the second device uses the private sharing mode.

In this implementation manner, the second device accesses a WLAN network and acquires an SSID of the network, and starts to detect whether the WLAN network is accessed for the first time. According to an existing WLAN network access module, after accessing a WLAN network, a mobile device automatically saves an SSID of the WLAN network and saves some access parameters of the WLAN network, for example, an access password, so that the mobile device can perform automatic discovery and automatic access after obtaining a signal of the WLAN network by means of search. For a specific implementation manner, reference is made to the process of the first device.

In a fourth implementation manner, the second device accesses a WLAN and acquires a network identifier of the WLAN; the second device finds whether the network identifier and a medium access control MAC address of a wireless access point AP corresponding to the network identifier exist in an access point list; and if the network identifier and the MAC address of the wireless access point AP corresponding to the network identifier exist in the access point list, the second device uses the private sharing mode.

In this embodiment, the second device is not limited to one device, and may be multiple mobile devices, and the shared media content of the first device may also be acquired securely by performing the foregoing steps. The second device may execute the method in all embodiments of the first device. The implementation principles thereof are similar, and are not further described herein.

Figure 11:
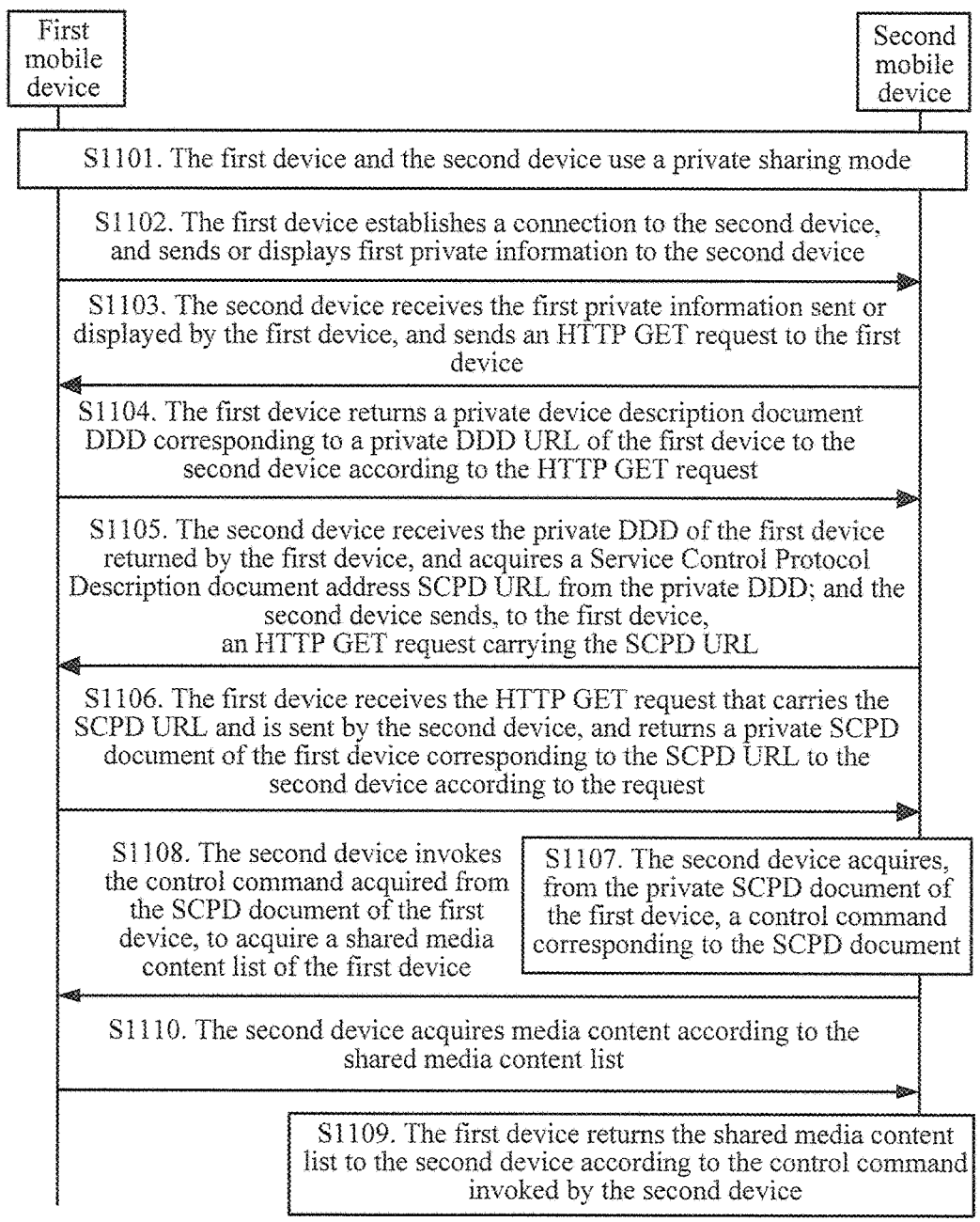
FIG. 11 is a signaling flowchart of Embodiment 16 of a media content sharing method according to the present invention.

FIG. 11 is a signaling flowchart of Embodiment 16 of a media content sharing method according to the present invention. Common DLNA devices are classified into the following types:

Digital media server (Digital Media Server, DMS for short): configured to store media files such as a picture, audio, and a video, for example, a device that can generate and store media content such as a picture, music, and a video program, for example, a smartphone, a tablet computer, a digital camera, or a portable computer.

Digital media player (Digital Media Player, DMP for short): a device configured to play media files such as a picture, audio, and a video, for example, a sound box, a TV set, a projector, a smartphone, a tablet computer, a portable computer, or a personal digital assistant (Personal Digital Assistant, PDA for short).

Digital media controller (Digital Media Controller, DMC for short): a device used for an online DMS and DMP in a network and configured to control devices, generally including a mobile handheld device such as a smartphone or a tablet computer.

In this embodiment, as shown in FIG. 6, a first device, used as a DMS device, shares media content with a second device used as a DMP device. The first device and the second device access a public WLAN network, and enable an application having a DLNA function. The first device and the second device multicast an SSDP online message to the WLAN network, where the SSDP online message carries a DDD URL and a UUID of the device and information indicating the device is a DMS or a DMP, and further carries a service supported by the device. The first device and the second device set, in the WLAN, a current mode to a private sharing mode. Specific implementation steps of the media content sharing method in this embodiment are as follows:

S1101. The first device and the second device use the private sharing mode.

In this embodiment, when both the first device and the second device use the private sharing mode, the first device generates first private information, and meanwhile, the first device and the second device each multicast an SSDP byebye message to the WLAN network, to notify that the first device and the second device have left the WLAN network.

S1102. The first device establishes a connection to the second device, and sends or displays the first private information to the second device.

In this embodiment, after the first device and the second device use the private sharing mode, their respective NFC communication chips may be triggered to generate radio frequency coupling to establish an NFC channel. The first device sends the first private information to the second device, or may send the first private information to the second device in a manner such as a two-dimensional code, Bluetooth, or a sound wave signal. The first private information includes a private DDD URL and a UUID of the first device.

S1103. The second device receives the first private information sent or displayed by the first device, and sends an HTTP GET request to the first device.

In this embodiment, the second device acquires the private DDD URL of the first device from the first private information, and sends, to the first device, the HTTP GET request carrying the DDD URL, to acquire a private DDD of the first device.

S1104. The first device returns a private device description document DDD corresponding to the private DDD URL of the first device to the second device according to the HTTP GET request.

In this embodiment, after receiving the HTTP GET request sent by the second device, the first device sends the private DDD to the second device, where the DDD includes a device type, a device name, a device manufacturer, a device identifier, and the like of the first device, and further includes service information supported by the first device. Each service is corresponding to three addresses, namely, a description address SCPD URL used to indicate a URL of an SCPD document of the service, a control address used to indicate a URL for invoking a corresponding control command in the service, and an event address used to indicate a URL for reporting an event message to a control point when parameters of some control commands in the service change.

S1105. The second device receives the private DDD of the first device returned by the first device, and acquires a Service Control Protocol Description document address SCPD URL from the private DDD; and the second device sends, to the first device, an HTTP GET request carrying the SCPD URL.

S1106. The first device receives the HTTP GET request that carries the SCPD URL and is sent by the second device, and returns a private SCPD document of the first device corresponding to the SCPD URL to the second device according to the request.

S1107. The second device acquires, from the private SCPD document of the first device, a control command corresponding to the SCPD document.

In this embodiment, the second device may acquire, from the SCPD document, a related control command of a service that is supported by the first device and a corresponding parameter variable.

S1108. The second device invokes the control command acquired from the SCPD document of the first device, to acquire a shared media content list of the first device.

In this embodiment, the second device invokes the acquired control command. For example, if the second device expects to acquire a media content list of a picture shared by the first device, the second device needs to invoke a CDS::Browse( )/Search( ) command from the first device, and the first device sends the media content list shared by the first device to the second device.

S1109. The first device returns the shared media content list to the second device according to the control command invoked by the second device.

S1110. The second device acquires media content according to the shared media content list.

In this embodiment, after acquiring the media content list of shared picture of the first device, the second device may acquire the shared picture of the first device by clicking, so that a picture stored in the first device can be shared with the second device.

According to the media content sharing method provided in this embodiment, a first device and a second device use a private sharing mode, and establish a connection between the devices; the first device sends first private information to the second device; the second device sends an HTTP GET request to the first device according to a DDD URL in the first private information to acquire a private DDD of the first device, and acquires an SCPD URL of the first device from the DDD document, and sends an HTTP GET request to the first device again to acquire a private SCPD document of the first device; the second device acquires a corresponding service control command from the SCPD document, and invokes the corresponding control command to acquire a shared media content list of the first device; and the second device acquires shared media content from the shared media content list. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

Figure 12A:
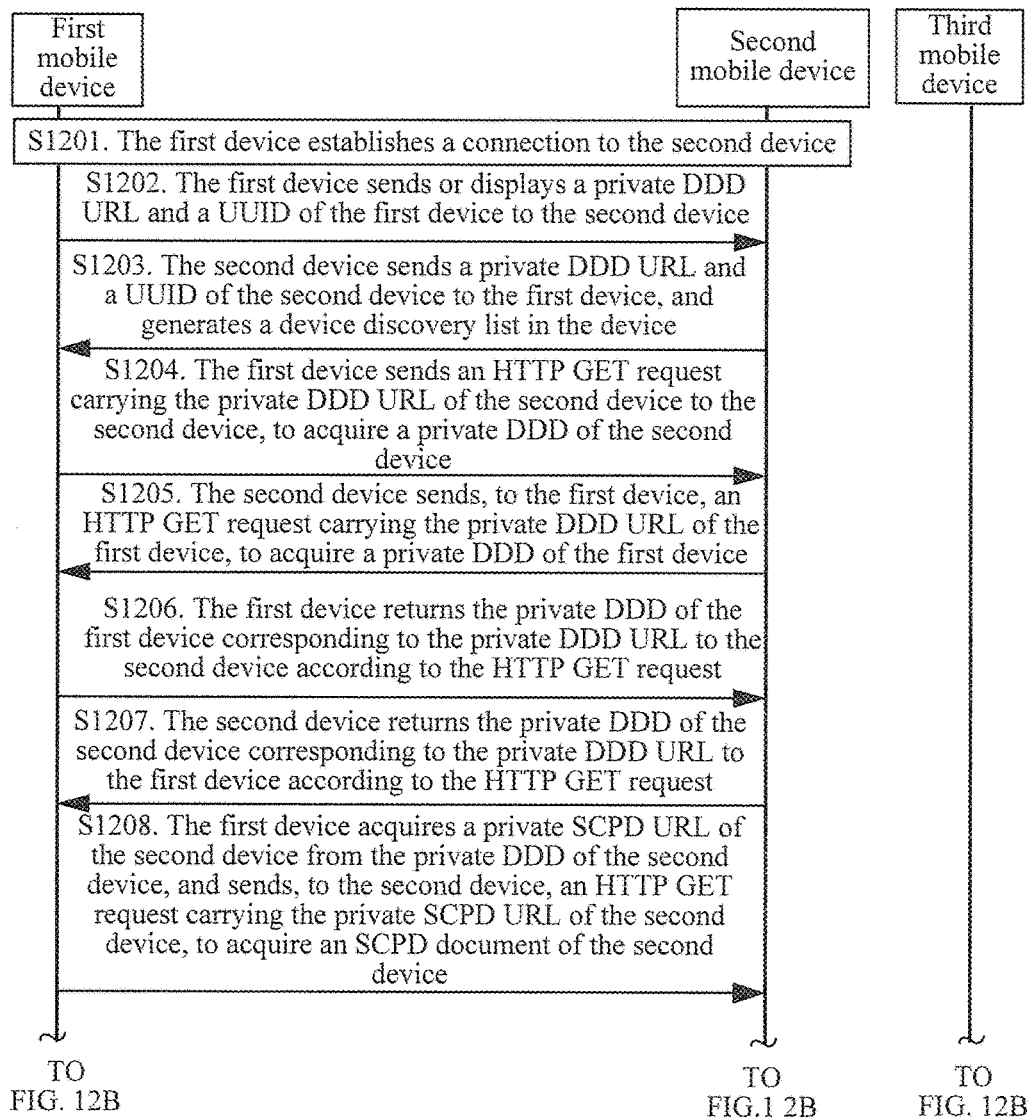
FIG. 12A and FIG. 12B are a signaling flowchart of Embodiment 17 of a media content sharing method according to the present invention.
Figure 12B:
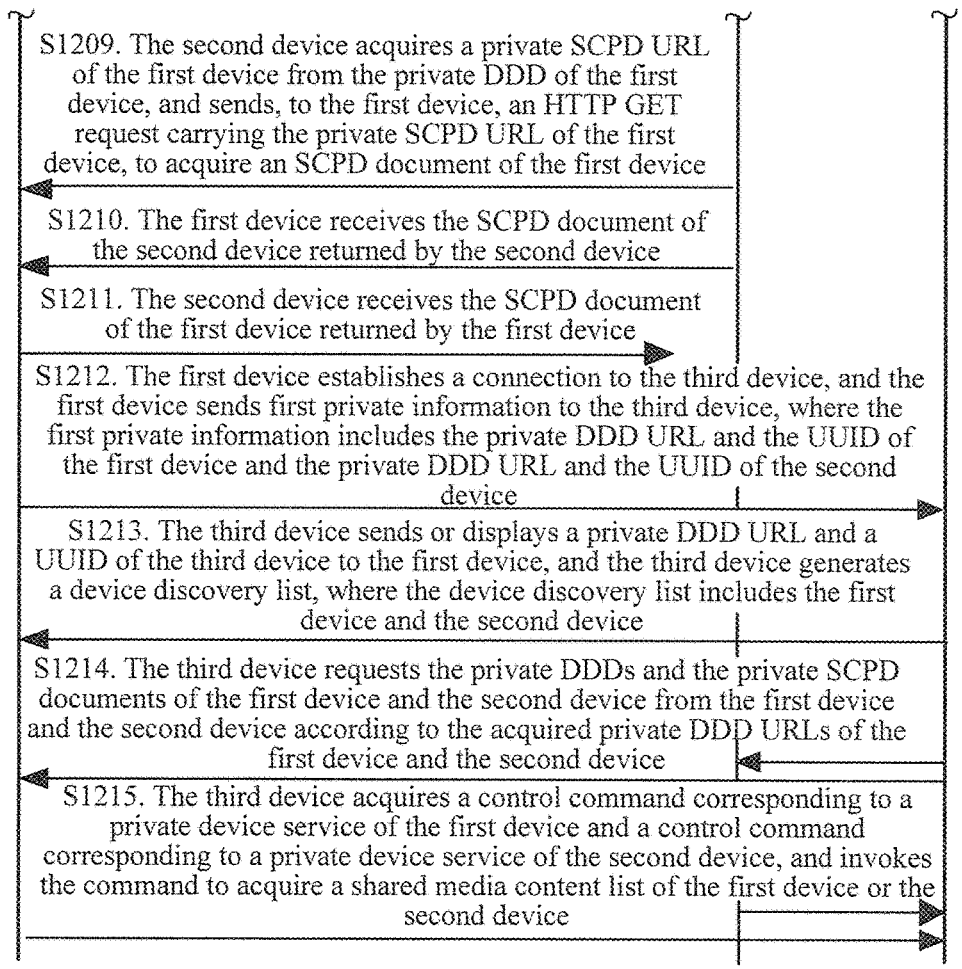

FIG. 12A and FIG. 12B are a signaling flowchart of Embodiment 17 of a media content sharing method according to the present invention. In this embodiment, the technical solution of this embodiment is described in detail by using an example in which three mobile devices enter a public WLAN network and all use a private sharing mode and the three mobile devices all need to share media content with the other two devices. As shown in FIG. 7, a specific implementation process of the method in this embodiment is as follows:

S1201. A first device establishes a connection to a second device.

S1202. The first device sends or displays a private DDD URL and a UUID of the first device to the second device.

S1203. The second device sends a private DDD URL and a UUID of the second device to the first device, and generates a device discovery list in the device.

In this embodiment, the first device and the second device are used as both a DMS and a DMP. Therefore, information sent by the first device and the second device should further carry their respective search (M-SEARCH) request messages in addition to their respective private DDD URLs and UUIDs, so that the mobile devices can generate a device discovery list after receiving a message from each other.

In this embodiment, the second device sends or displays first private information of the second device to the first device. The first device and the second device exchange private DDD URLs and private UUIDs of the first device and second device that are used as a DMS or a DMP in their respective DLNA application programs. Because the mobile devices are used as both a DMS and a DMP, the sent information should further carry M-SEARCH request messages of the first device and the second device that are used as a DMP, in addition to the foregoing private DDD URLs and UUIDs. For example, a specific format of a packet sent by the first device to the second device is:

NOTIFY * HTTP/1.1
HOST:239.255.255.250:1900
EXT:
CACHE-CONTROL: max-age=1810
LOCATION: http://10.11.84.153:7050/upnpdevicedescription/friendsharing

```
NT: urn:schemas-upnp-org:device:MediaServer:1
NTS: ssdp:alive
SERVER: Windows NT/5.0, UPnP/1.0, Huawei UPnP SDK/1.0
USN:
uuid:d1578360-feb3-1167-1000-2c27d742936c::urn:schemas-upnp-org:device:MediaServer:1
M-SEARCH * HTTP/1.1
ST: urn:schemas-upnp-org:device:MediaServer:1
MX: 3
MAN: "ssdp:discover"
HOST: 239.255.255.250:1900
```

After receiving a discovery message packet from each other, both the first device and the second device generate a device discovery list to record device information that is discovered in the private sharing mode through an NFC channel. For example, after the first device receives a data packet sent by the second device, a specific format of a packet of the generated device discovery list is:

```
<device_discovery_list>
<deviceItem #0>
<deviceType>urn:schema-upnp-org:device:MediaServer:1</deviceType>
<ipAddr>10.11.84.153</ipAddr>
<Location>http://10.11.84.153:7050/upnpdevicedescription/friendsharing</Location>
<uuid>d1578360-feb3-1167-1000-2c27d742936c</uuid>
</deviceItem>
<deviceItem #1>
<deviceType>urn:schema-upnp-org:MediaServerControlPoint:1</deviceType>
<ipAddr>10.11.84.153</ipAddr>
<ST>urn:schemas-upnp-org:device:MediaServer:1</uuid>
</deviceItem>
</device_discovery_list>
```

The device discovery list generated by the first device includes a DMS and a DMP that are both the second device. Likewise, the device discovery list generated by the second device includes the first device that is used as both a DMS and a DMP.

S1204. The first device sends, to the second device, an HTTP GET request carrying the private DDD URL of the second device, to acquire a private DDD of the second device.

S1205. The second device sends, to the first device, an HTTP GET request carrying the private DDD URL of the first device, to acquire a private DDD of the first device.

S1206. The first device returns the private DDD of the first device corresponding to the private DDD URL to the second device according to the HTTP GET request.

S1207. The second device returns the private DDD of the second device corresponding to the private DDD URL to the first device according to the HTTP GET request.

S1208. The first device acquires a private SCPD URL of the second device from the private DDD of the second device, and sends, to the second device, an HTTP GET request carrying the private SCPD URL of the second device, to acquire an SCPD document of the second device.

S1209. The second device acquires a private SCPD URL of the first device from the private DDD of the first device, and sends, to the first device, an HTTP GET request carrying the private SCPD URL of the first device, to acquire an SCPD document of the first device.

S1210. The first device receives the SCPD document of the second device returned by the second device.

S1211. The second device receives the SCPD document of the first device returned by the first device.

After acquiring a control command from the SCPD document of each other, the first device and the first device may acquire a shared media content list shared by each other, and further acquire shared media content. For a specific acquiring manner, reference is made to Embodiment 3. The principles and implementation manners are similar, and are not further described herein.

S1212. The first device establishes a connection to a third device, and the first device sends first private information to the third device, where the first private information includes the private DDD URL and the UUID of the first device and the private DDD URL and the UUID of the second device; and the first device updates the device discovery list, and adds the third device to the list.

S1213. The third device sends or displays a private DDD URL and a UUID of the third device to the first device, and the third device generates a device discovery list, where the device discovery list includes the first device and the second device.

In this embodiment, the device discovery list stored in the DLNA application program of the first device includes the second device, that is, the third device has discovered the second device in a private sharing mode. The device discovery list stored in a DLNA application program of the third device is updated and a discovery message of the second device is added, where the discovery message carries the private DDD URL and the UUID of the second device.

S1214. The third device requests the private DDDs and the private SCPD documents of the first device and the second device from the first device and the second device according to the acquired private DDD URLs of the first device and the second device.

S1215. The third device acquires a control command corresponding to a private device service of the first device and a control command corresponding to a private device service of the second device, and invokes the command to acquire a shared media content list of the first device or the second device.

When the third device in this embodiment is multiple mobile devices, sharing of media content may also be performed in a same manner.

According to the media content sharing method provided in this embodiment, a first device and a second device are multiple devices and all use a private sharing mode, and establish an NFC channel between the devices; the first device and the second device exchange their respective private DDD URLs and UUIDs; the first device sends an HTTP GET request to acquire a private DDD of the second device, and acquires an SCPD URL of the second device from the DDD document, and sends an HTTP GET request to the second device again to acquire a private SCPD document of the second device; meanwhile, the second device sends an HTTP GET request to acquire a private DDD of the first device, and acquires an SCPD URL of the first device from the DDD document, and sends an HTTP GET request to the first device again to acquire a private SCPD document of the first device. The first device establishes an NFC channel with a third device, and sends first private information including the private DDD URL and the UUID of the second device to the third device; meanwhile, the third device sends a private DDD URL and a UUID of the third device to the first device, and updates a device discovery list; mobile devices may acquire a control command from each other, and invoke a corresponding control command to acquire a shared media content list of the mobile devices, and acquire responsive media content. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage. In addition, in a case in which a large number of mobile devices exist, sharing of media content between every two mobile devices may be established rapidly, which facilitates a user operation and improves user experience.

Figure 13:
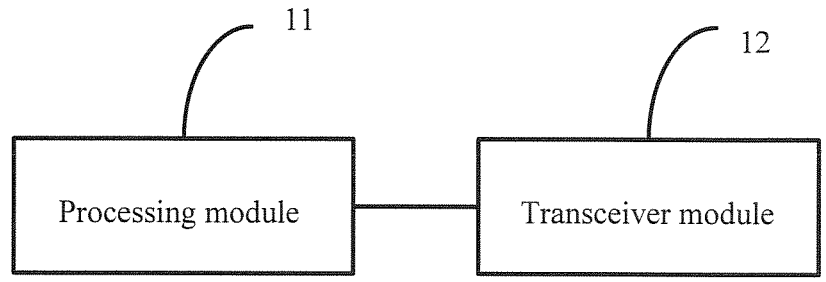
FIG. 13 is a schematic structural diagram of Embodiment 1 of a media content sharing apparatus according to the present invention.

FIG. 13 is a schematic structural diagram of Embodiment 1 of a media content sharing apparatus according to the present invention. As shown in FIG. 13, the media content sharing apparatus includes a processing module 11 and a transceiver module 12. The processing module 11 is configured to, when the media content sharing apparatus uses a private sharing mode, acquire first private information corresponding to the private sharing mode; and the transceiver module 12 is configured to send or display the first private information to a second device, so that the second device acquires the first private information and acquires shared media content of the media content sharing apparatus according to the first private information.

The media content sharing apparatus in this embodiment is configured to execute the technical solution of the method embodiment shown in FIG. 1. The implementation manners and principles thereof are similar, and are not further described herein. According to the apparatus, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

On a basis of the foregoing embodiment, the transceiver module 12 includes:

a near field communication unit, configured to establish an NFC channel with the second device by using a near field communication NFC mode, and send the first private information to the second device through the NFC channel; or a Bluetooth processing unit, configured to establish a Bluetooth piconet with the second device by using a Bluetooth mode, and send the first private information to the second device in the Bluetooth piconet; or an image encoding unit, configured to encode the first private information to generate a two-dimensional code image, and display the first private information in the two-dimensional code image form, so that the second device captures the two-dimensional code image and acquires the first private information; or a sound wave encoding unit, configured to encode the first private information to generate a sound wave signal, and propagate the sound wave signal, so that the second device receives the sound wave signal through a microphone and acquires the first private information by decoding the sound wave signal.

Optionally, the first private information is a private device description document uniform resource locator DDD URL of the media content sharing apparatus and a private universally unique identifier UUID of the media content sharing apparatus; and the transceiver module 12 is specifically configured to:

send or display the first private information to the second device, and receive a first request message sent by the second device, where the first request message carries the private DDD URL of the media content sharing apparatus;

send second private information to the second device according to the first request message, where the second private information includes a private device description document DDD corresponding to the private DDD URL, and the private DDD includes a private Service Control Protocol Description SCPD document URL of the media content sharing apparatus, so that the second device acquires a corresponding private SCPD document according to the private SCPD document URL and invokes a corresponding control instruction according to the private SCPD document; and send a shared media content list of the media content sharing apparatus to the second device according to the control instruction, so that the second device acquires the shared media content from the shared media content list, where the control instruction is an instruction invoked by the second device according to the private SCPD document.

Optionally, the transceiver module 12 is further configured to receive a private DDD URL and UUID information of the second device sent by the second device.

Optionally, the first private information is a private identifier of the media content sharing apparatus; and the transceiver module is specifically configured to:

send or display the first private information to the second device, so that the second device directly accesses the media content sharing apparatus according to the private identifier of the media content sharing apparatus and acquires the shared media content of the media content sharing apparatus.

Optionally, the transceiver module 12 is further configured to receive a private identifier of the second device.

Optionally, the first private information includes a private identifier of the media content sharing apparatus; and the transceiver module 12 is specifically configured to:

send the first private information to the second device, and receive a first authentication message sent by the second device, where the first authentication message is generated by the second device by encrypting an encryption sequence according to the key;

decrypt the first authentication message according to the key to obtain the encryption sequence, and establish a secure channel between the first device and the second device according to the encryption sequence; and send a shared media content list of the first device to the second device on the secure channel according to a control instruction, so that the second device acquires the shared media content from the shared media content list.

Optionally, the transceiver module 12 is further configured to receive a private sharing mode configuration instruction sent by a user, and use the private sharing mode according to the instruction.

The media content sharing apparatus provided in this embodiment is configured to execute the technical solution of the method embodiment. The implementation principles and technical effects thereof are similar, and are not further described herein.

Figure 14:
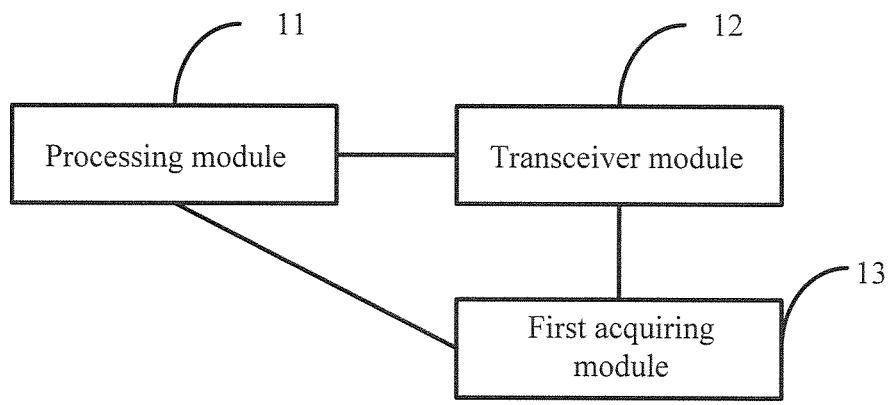
FIG. 14 is a schematic structural diagram of Embodiment 2 of a media content sharing apparatus according to the present invention.

FIG. 14 is a schematic structural diagram of Embodiment 2 of a media content sharing apparatus according to the present invention. As shown in FIG. 14, on a basis of the foregoing embodiment shown in FIG. 13, the apparatus further includes a first acquiring module 13, configured to, when the media content sharing apparatus accesses a wireless local area network WLAN, acquire a network identifier of the WLAN; where the processing module 11 is further configured to determine, according to the network identifier, whether the WLAN is a public network, and if the WLAN is a public network, use the private sharing mode.

The media content sharing apparatus provided in this embodiment is configured to execute the technical solution of the method embodiment. The implementation principles and technical effects thereof are similar, and are not further described herein.

Figure 15:
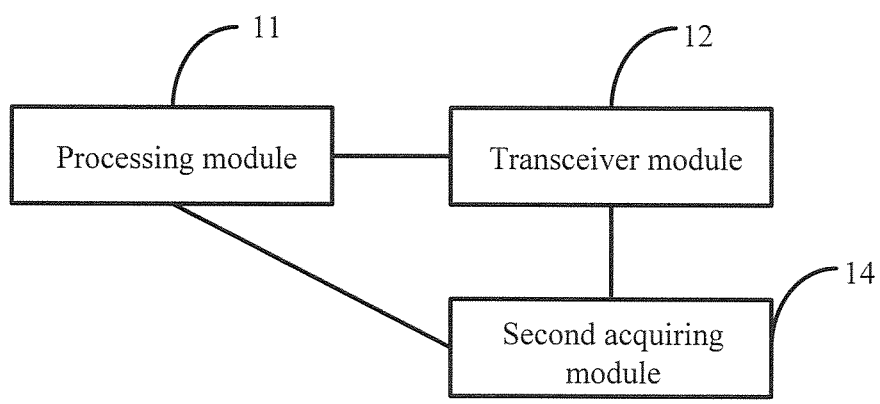
FIG. 15 is a schematic structural diagram of Embodiment 3 of a media content sharing apparatus according to the present invention.

Optionally, FIG. 15 is a schematic structural diagram of Embodiment 3 of a media content sharing apparatus according to the present invention. As shown in FIG. 15, on a basis of the foregoing embodiment shown in FIG. 13, the apparatus further includes a second acquiring module 14, configured to, when the media content sharing apparatus accesses a WLAN, acquire a network identifier of the WLAN; where the processing module 11 is further configured to: determine, according to the network identifier, whether the media content sharing apparatus accesses the WLAN for the first time;

if it is determined, according to the network identifier, that the media content sharing apparatus accesses the WLAN for the first time, generate prompt information to prompt the user whether to select the private sharing mode; and when the transceiver module 12 receives selection information that is sent by the user according to the prompt information and the selection information includes the private sharing mode, use the private sharing mode.

The media content sharing apparatus provided in this embodiment is configured to execute the technical solution of the method embodiment. The implementation principles and technical effects thereof are similar, and are not further described herein.

Figure 16:
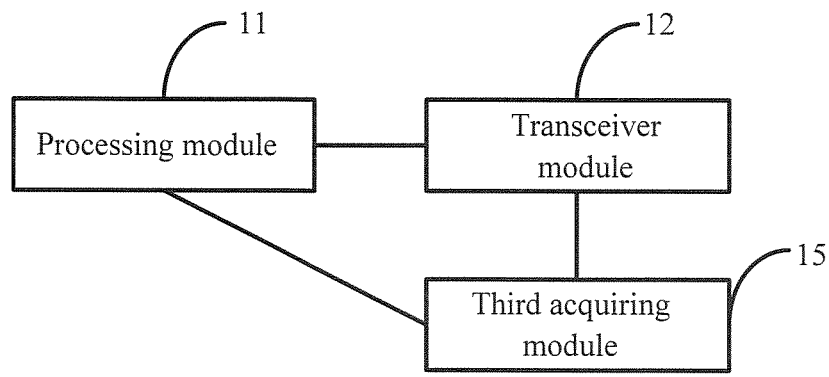
FIG. 16 is a schematic structural diagram of Embodiment 4 of a media content sharing apparatus according to the present invention.

Optionally, FIG. 16 is a schematic structural diagram of Embodiment 4 of a media content sharing apparatus according to the present invention. As shown in FIG. 16, on a basis of the foregoing embodiment shown in FIG. 13, the apparatus further includes a third acquiring module 15, configured to, when the media content sharing apparatus accesses a WLAN, acquire a network identifier of the WLAN; where the processing module 11 is further configured to: find whether the network identifier and a medium access control MAC address of a wireless access point AP corresponding to the network identifier exist in an access point list; and if the network identifier and the MAC address of the AP corresponding to the network identifier exist in the access point list, use the private sharing mode.

The media content sharing apparatus provided in this embodiment is configured to execute the technical solution of the method embodiment. The implementation principles and technical effects thereof are similar, and are not further described herein.

Figure 17:
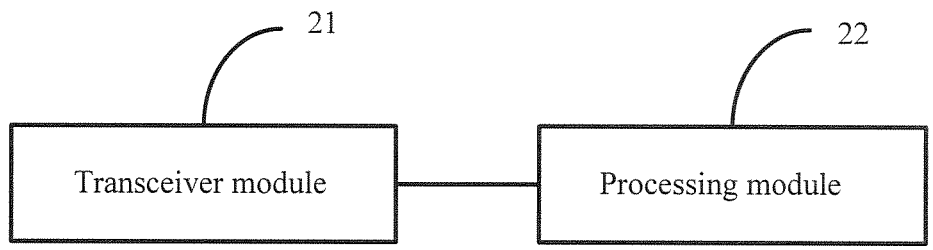
FIG. 17 is a schematic structural diagram of Embodiment 5 of a media content sharing apparatus according to the present invention.

FIG. 17 is a schematic structural diagram of Embodiment 5 of a media content sharing apparatus according to the present invention. As shown in FIG. 17, the media content sharing apparatus includes a transceiver module 21 and a processing module 22. The transceiver module 21 is configured to acquire first private information sent by a first device, where the media content sharing apparatus currently uses a private sharing mode; and the processing module 22 is configured to acquire shared media content of the first device according to the first private information.

The media content sharing apparatus in this embodiment is configured to execute the technical solution of the method embodiment shown in FIG. 8. The implementation steps and technical principles thereof are the same, and are not further described herein. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

On a basis of the foregoing embodiment, the transceiver module 21 includes: a near field communication unit, configured to establish the NFC channel with the first device by using a near field communication NFC mode, and receive, through the NFC channel, the first private information sent by the first device; or a Bluetooth processing unit, configured to establish a Bluetooth piconet with the first device by using a Bluetooth mode, and receive, in the Bluetooth piconet, the first private information sent by the first device; or an image processing unit, configured to capture a two-dimensional code image displayed by the first device, and acquire the first private information of the first device, where the two-dimensional code image is a two-dimensional code image generated by the first device by encoding the first private information; or a sound wave processing unit, configured to receive, through a microphone, a sound wave signal propagated by the first device, and decode the sound wave signal to acquire the first private information of the first device, where the sound wave signal is a sound wave signal generated by the first device by encoding the first private information.

Optionally, the first private information is a private device description document uniform resource locator DDD URL of the first device and a private universally unique identifier UUID of the first device, and the transceiver module 21 is configured to send a first request message to the first device, where the first request message carries the private DDD URL of the first device; and the transceiver module 21 is configured to receive second private information sent by the first device, where the second private information includes a private device description document DDD corresponding to the private DDD URL of the first device, and the private DDD includes a private Service Control Protocol Description SCPD document URL of the first device; and the processing module 22 is configured to acquire a corresponding private SCPD document from the first device according to the private SCPD document URL, and invoke a corresponding control instruction according to the private SCPD document, so that the first device sends a shared media content list of the first device according to the control instruction; and the processing module 22 is further configured to acquire the shared media content from the shared media content list.

Optionally, the transceiver module 21 is further configured to send a private DDD URL and UUID information of the media content sharing apparatus to the first device.

Optionally, the first private information is a private identifier of the first device; and the transceiver module 21 is configured to receive the first private information sent by the first device, and the processing module 22 directly accesses the first device according to the private identifier of the first device, and acquires the shared media content of the first device.

Optionally, the transceiver module 21 is further configured to send a private identifier of the media content sharing apparatus to the first device.

Optionally, the first private information includes a key generated by the first device; and the transceiver module 21 is configured to:

acquire the first private information sent or displayed by the first device, and generate a first authentication message by encrypting an encryption sequence according to the key;

send the first authentication message to the first device, so that the first device decrypts the first authentication message according to the key to obtain the encryption sequence, and establishes a secure channel with the second device according to the encryption sequence; and invoke a control instruction, acquire, through the secure channel, a shared media content list of the first device sent by the first device, and acquire the shared media content from the shared media content list.

Optionally, the transceiver module 21 is further configured to receive a private sharing mode instruction sent by a user, and the processing module 22 uses the private sharing mode according to the instruction.

The media content sharing apparatus provided in this embodiment is configured to execute the technical solution of the method embodiment. The implementation principles and technical effects thereof are similar, and are not further described herein.

Figure 18:
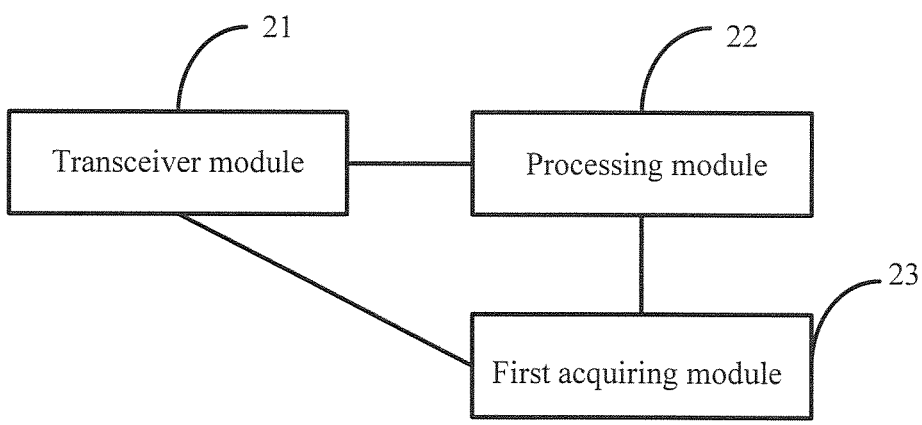
FIG. 18 is a schematic structural diagram of Embodiment 6 of a media content sharing apparatus according to the present invention.

Optionally, FIG. 18 is a schematic structural diagram of Embodiment 6 of a media content sharing apparatus according to the present invention. As shown in FIG. 18, on a basis of the foregoing embodiment shown in FIG. 17, the apparatus further includes a first acquiring module 23, configured to, when a WLAN is accessed, acquire a network identifier of the WLAN; where the processing module 22 is configured to determine, according to the network identifier, whether the WLAN is a public network, and if the WLAN is a public network, use the private sharing mode.

The media content sharing apparatus provided in this embodiment is configured to execute the technical solution of the method embodiment. The implementation principles and technical effects thereof are similar, and are not further described herein.

Figure 19:
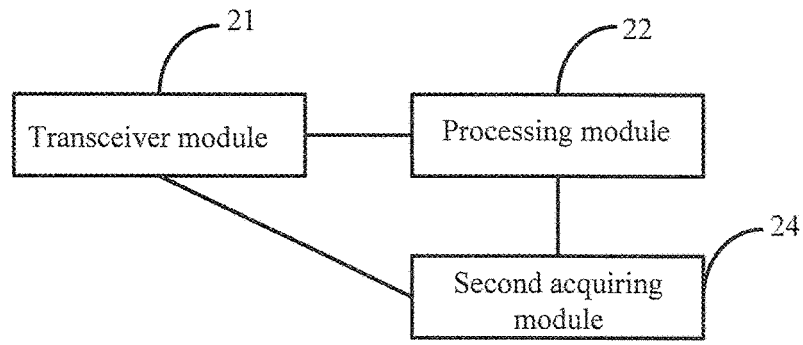
FIG. 19 is a schematic structural diagram of Embodiment 7 of a media content sharing apparatus according to the present invention.

Optionally, FIG. 19 is a schematic structural diagram of Embodiment 7 of a media content sharing apparatus according to the present invention. As shown in FIG. 19, on a basis of the foregoing embodiment shown in FIG. 17, the apparatus further includes a second acquiring module 24, configured to, when a WLAN is accessed, acquire a network identifier of the WLAN; where the processing module 22 is configured to: determine, according to the network identifier, whether the media content sharing apparatus accesses the WLAN for the first time; if it is determined, according to the network identifier, that the media content sharing apparatus accesses the WLAN for the first time, generate prompt information to prompt the user whether to select the private sharing mode; and when the transceiver module 21 receives selection information that is sent by the user according to the prompt information and the selection information includes the private sharing mode, use the private sharing mode.

The media content sharing apparatus provided in this embodiment is configured to execute the technical solution of the method embodiment. The implementation principles and technical effects thereof are similar, and are not further described herein.

Figure 20:
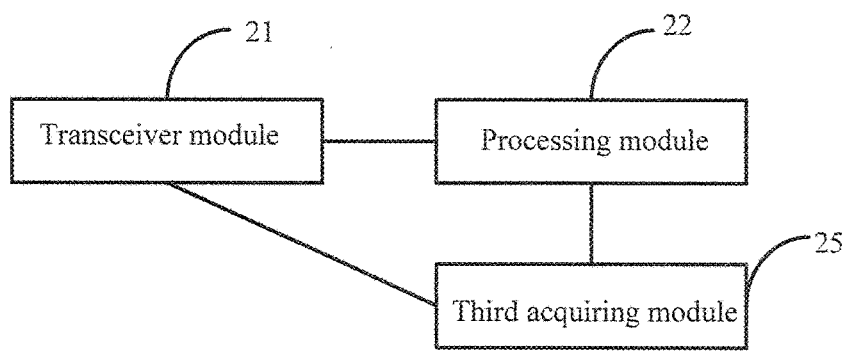
FIG. 20 is a schematic structural diagram of Embodiment 8 of a media content sharing apparatus according to the present invention.

Optionally, FIG. 20 is a schematic structural diagram of Embodiment 8 of a media content sharing apparatus according to the present invention. As shown in FIG. 20, on a basis of the foregoing embodiment shown in FIG. 17, the apparatus further includes a third acquiring module 25, configured to, when a WLAN is accessed, acquire a network identifier of the WLAN; where the processing module 22 is configured to: find whether the network identifier and a medium access control MAC address of a wireless access point AP corresponding to the network identifier exist in an access point list; and if the network identifier and the MAC address of the wireless access point AP corresponding to the network identifier exist in the access point list, use the private sharing mode.

The media content sharing apparatus provided in this embodiment is configured to execute the technical solution of the method embodiment. The implementation principles and technical effects thereof are similar, and are not further described herein.

Figure 21:
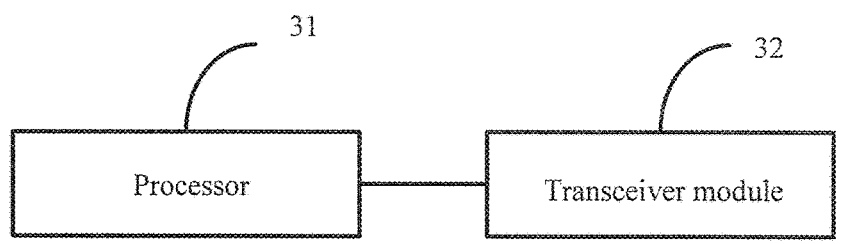
FIG. 21 is a schematic structural diagram of Embodiment 1 of a terminal device according to the present invention.

FIG. 21 is a schematic structural diagram of Embodiment 1 of a terminal device according to the present invention. As shown in FIG. 21, the terminal device includes a processor 31 and a transceiver module 32. The processor 31 is configured to set the terminal device to a private sharing mode, and acquire first private information corresponding to the private sharing mode; and the transceiver module 32 is configured to send or display the first private information to another terminal device, so that the another terminal device acquires the first private information and acquires shared media content of the terminal device according to the first private information.

The terminal device provided in this embodiment is configured to execute the technical solutions shown in FIG. 1 to FIG. 12A and FIG. 12B. A processor sets the terminal device to a private sharing mode, and acquires first private information of the terminal device; and a transceiver sends or displays the first private information to another terminal device, so that the another terminal device further acquires shared media content of the terminal device. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

Figure 22:
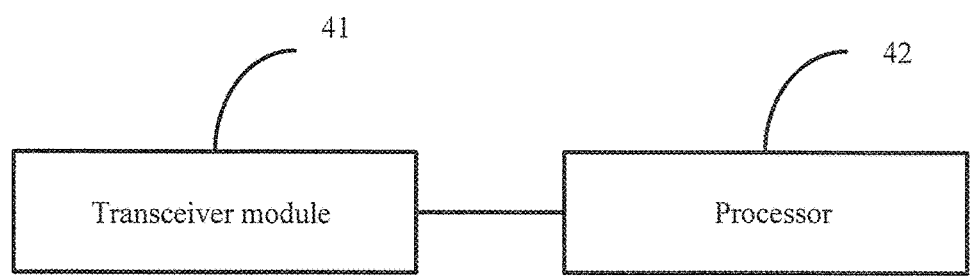
FIG. 22 is a schematic structural diagram of Embodiment 3 of a terminal device according to the present invention.

In Embodiment 2 of the terminal device according to the present invention, on a basis of the foregoing embodiment, as shown in FIG. 22, the transceiver module 32 specifically includes:

an NFC transmitter, configured to establish an NFC channel with the another terminal device, and send the first private information to the another terminal device through the NFC channel; or a Bluetooth transmitter, configured to establish a Bluetooth piconet with the another terminal device, and send the first private information to the another terminal device in the Bluetooth piconet; or an image encoder, configured to encode the first private information to generate a two-dimensional code image, and display, through a display, the first private information corresponding to the two-dimensional code image form, so that the another terminal device captures the two-dimensional code image and acquires the first private information; or a sound encoder, configured to encode the first private information to generate a sound wave signal, and propagate the sound wave signal through a speaker, so that the another terminal device receives the sound wave signal through a microphone and acquires the first private information by decoding the sound wave signal.

Optionally, the first private information includes a private device description document uniform resource locator DDD URL of the terminal device and a private universally unique identifier UUID of the terminal device; and the transceiver module 32 is specifically configured to:

send or display the first private information to the another terminal device, and receive a first request message sent by the another terminal device, where the first request message carries the private DDD URL of the terminal device;

send second private information to the another terminal device according to the first request message, where the second private information includes a private device description document DDD corresponding to the private DDD URL, and the private DDD includes a private Service Control Protocol Description SCPD document URL of the terminal device, so that the another terminal device acquires a corresponding private SCPD document according to the private SCPD document URL and invokes a corresponding control instruction according to the private SCPD document; and send a shared media content list of the terminal device to the another terminal device according to the control instruction, so that the another terminal device acquires the shared media content from the shared media content list, where the control instruction is an instruction invoked by the another terminal device according to the private SCPD document.

Optionally, the first private information is a private identifier of the terminal device; and the transceiver module 32 is specifically configured to:

send or display the first private information to the another terminal device, so that the another terminal device directly accesses the terminal device according to the private identifier of the terminal device and acquires the shared media content of the terminal device.

Optionally, the first private information includes a key generated by the terminal device, and the transceiver module 32 is configured to send the first private information to the another terminal device, and receive a first authentication message sent by the another terminal device, where the first authentication message is generated by the another terminal device by encrypting an encryption sequence according to the key;

the processor 31 is configured to decrypt the first authentication message according to the key to obtain the encryption sequence, and establish a secure channel between the terminal device and the another terminal device according to the encryption sequence; and the transceiver module 32 is further configured to send a shared media content list of the terminal device to the another terminal device on the secure channel according to a control instruction, so that the another terminal device acquires the shared media content from the shared media content list.

Optionally, the transceiver module 32 is further configured to acquire first private information of the another terminal device sent or displayed by the another terminal device.

Optionally, the processor 31 is further configured to:

access a wireless local area network WLAN and acquire a network identifier of the WLAN;

determine, according to the network identifier, whether the WLAN is a public network; and if the WLAN is a public network, use the private sharing mode.

Optionally, the processor 31 is further configured to:

access a WLAN and acquire a network identifier of the WLAN;

determine, according to the network identifier, whether the terminal device accesses the WLAN for the first time;

if it is determined, according to the network identifier, that the WLAN is the WLAN that is accessed by the terminal device for the first time, generate prompt information to prompt the user whether to select the private sharing mode; and when the transceiver module 32 receives selection information that is sent by the user according to the prompt information and the selection information includes the private sharing mode, use the private sharing mode.

Optionally, the processor 31 is further configured to:

access a WLAN and acquire a network identifier of the WLAN;

find whether the network identifier and a medium access control MAC address of a wireless access point AP corresponding to the network identifier exist in an access point list; and if the network identifier and the MAC address of the AP corresponding to the network identifier exist in the access point list, use the private sharing mode.

The terminal device provided in this embodiment is corresponding to the technical solutions of the first device in the methods shown in FIG. 1 to FIG. 12A and FIG. 12B, and is configured to execute the technical solutions shown in FIG. 1 to FIG. 12A and FIG. 12B. The implementation principles and technical effects thereof are similar, and are not further described herein.

FIG. 22 is a schematic structural diagram of Embodiment 3 of a terminal device according to the present invention. As shown in FIG. 22, the terminal device includes a transceiver module 41 and a processor 42. The transceiver module 41 is configured to acquire first private information sent or displayed by another terminal device; the processor 42 is configured to set the terminal device to a private sharing mode currently; and the transceiver module 41 is further configured to acquire shared media content of the first device according to the first private information.

According to the terminal device provided in this embodiment, a processor sets the terminal device to a private sharing mode; and a transceiver module acquires first private information that is corresponding to the private mode and sent by another terminal device, and acquires shared media content of the another terminal device according to the first private information. Therefore, a problem in the prior art that security of shared media content of a DLNA device is poor because any control point device accessing the public WLAN network can discover an online DLNA device and acquire shared media content of the DLNA device but the DLNA device knows nothing about this is solved, thereby avoiding privacy leakage.

In Embodiment 4 of the terminal device according to the present invention, on a basis of the foregoing embodiment, the transceiver module 41 specifically includes: an NFC transmitter, configured to establish an NFC channel with the another terminal device, and receive, through the NFC channel, the first private information sent by the another terminal device; or a Bluetooth transmitter, configured to establish a Bluetooth piconet with the another terminal device, and receive, in the Bluetooth piconet, the first private information sent by the another terminal device; or a camera, configured to capture a two-dimensional code image displayed by the another terminal device, and acquire the first private information of the another terminal device, where the two-dimensional code image is a two-dimensional code image generated by the another terminal device by encoding the first private information; or a sound wave decoder, configured to receive, through a sound collecting module, a sound wave signal propagated by the another terminal device, and decode the sound wave signal to acquire the first private information of the another terminal device, where the sound wave signal is a sound wave signal generated by the another terminal device by encoding the first private information.

Optionally, the first private information includes a private device description document uniform resource locator DDD URL of the another terminal device and a private universally unique identifier UUID of the another terminal device; and the transceiver module 41 is specifically configured to:

send a first request message to the another terminal device, where the first request message carries the private DDD URL of the another terminal device;

receive second private information sent by the another terminal device, where the second private information includes a private device description document DDD corresponding to the private DDD URL of the another terminal device, and the private DDD includes a private Service Control Protocol Description SCPD document URL of the another terminal device;

acquire a corresponding private SCPD document from the another terminal device according to the private SCPD document URL, and invoke a corresponding control instruction according to the private SCPD document, so that the another terminal device sends a shared media content list of the another terminal device according to the control instruction; and acquire the shared media content from the shared media content list.

Optionally, the first private information is a private identifier of the another terminal device; and the transceiver module 41 is specifically configured to:

acquire the first private information sent by the another terminal device, directly access the another terminal device according to the private local domain name of the another terminal device, and acquire the shared media content of the another terminal device.

Optionally, the first private information includes a key generated by the another terminal device; and the transceiver module 41 is specifically configured to:

acquire the first private information sent or displayed by the another terminal device, and generate a first authentication message by encrypting an encryption sequence according to the key;

send the first authentication message to the another terminal device, so that the another terminal device decrypts the first authentication message according to the key to obtain the encryption sequence, and establishes a secure channel with the terminal device according to the encryption sequence; and invoke a control instruction, acquire, through the secure channel, a shared media content list of the another terminal device sent by the another terminal device, and acquire the shared media content from the shared media content list.

Optionally, the transceiver module 41 is further configured to send or display first private information of the terminal device to the another terminal device.

Optionally, the processor 42 is specifically configured to:
access a WLAN and acquire a network identifier of the WLAN;

determine, according to the network identifier, whether the WLAN is a public network; and if the WLAN is a public network, use the private sharing mode.

Optionally, the processor 42 is specifically configured to:
access a WLAN and acquire a network identifier of the WLAN;

determine, according to the network identifier, whether the terminal device accesses the WLAN for the first time;

if it is determined, according to the network identifier, that the terminal device accesses the WLAN for the first e, generate prompt information to prompt the user whether to select the private sharing mode; and when the transceiver module 41 receives selection information that is sent by the user according to the prompt information and the selection information includes the private sharing mode, use the private sharing mode.

Optionally, the processor 42 is specifically configured to:
access a WLAN and acquire a network identifier of the WLAN;

find whether the network identifier and a medium access control MAC address of a wireless access point AP corresponding to the network identifier exist in an access point list; and if the network identifier and the MAC address of the wireless access point AP corresponding to the network identifier exist in the access point list, use the private sharing mode.

The implementation manner of the terminal device provided in this embodiment is the same as that of the second device in the method embodiments provided in FIG. 1 to FIG. 12A and FIG. 12B of the present invention. The terminal device is configured to execute the technical solutions shown in FIG. 1 to FIG. 12A and FIG. 12B. For the implementation method, principle, and technical effect thereof, reference may be made to the method embodiments, which are not further described herein.

Persons of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. A media content sharing method, comprising:
   using, by a first device, a private sharing mode, and acquiring first private information corresponding to the private sharing mode, wherein the first private information comprises a private device description document uniform resource locator (DDD URL) of the first device and a private universally unique identifier (UUID) of the first device;
   sending or displaying, by the first device, the first private information to the second device, and receiving a first request message sent by the second device, wherein the first request message carries the private DDD URL of the first device;
   sending, by the first device, second private information to the second device according to the first request message, wherein the second private information comprises a private device description document (DDD) corresponding to the private DDD URL, and the private DDD comprises a private Service Control Protocol Description (SCPD) document URL of the first device, wherein the second device acquires a corresponding private SCPD document according to the private SCPD document URL and invokes a corresponding control instruction according to the private SCPD document; and
   sending, by the first device, a shared media content list of the first device to the second device according to the control instruction, wherein the second device acquires the shared media content from the shared media content list, wherein the control instruction is an instruction invoked by the second device according to the private SCPD document.

2. The method according to claim 1, wherein sending or displaying, by the first device, the first private information to the second device comprises:
   establishing, by the first device, an NFC channel with the second device, and sending the first private information to the second device through the NFC channel; or
   establishing, by the first device, a Bluetooth piconet with the second device, and sending the first private information to the second device in the Bluetooth piconet; or
   encoding, by the first device, the first private information to generate a two-dimensional code image, and displaying the first private information corresponding to the two-dimensional code image form, so that the second device captures the two-dimensional code image and acquires the first private information; or
   encoding, by the first device, the first private information to generate a sound wave signal, and propagating the sound wave signal, so that the second device receives the sound wave signal through a microphone and acquires the first private information by decoding the sound wave signal.

3. The method according to claim any one of claim 1, wherein after sending or displaying, by the first device, the first private information to the second device, the method further comprises:
   acquiring, by the first device, first private information of the second device that is sent or displayed by the second device.

4. A first terminal device, comprising:
   a processor, configured to set the terminal device to a private sharing mode, and acquire first private information corresponding to the private sharing mode, wherein the first private information comprises a private device description document uniform resource locator (DDD URL) of the first terminal device and a private universally unique identifier (UUID) of the first terminal device; and
   a transceiver is configured to:
   send or display the first private information to a second terminal device, and receive a first request message sent by the second terminal device, wherein the first request message carries the private DDD URL of the first terminal device;
   send second private information to the second terminal device according to the first request message, wherein the second private information comprises a private device description document DDD corresponding to the private DDD URL, and the private DDD comprises a private Service Control Protocol Description (SCPD) document URL of the terminal device, wherein the second terminal device acquires a corresponding private SCPD document according to the private SCPD document URL and invokes a corresponding control instruction according to the private SCPD document; and
   send a shared media content list of the fir terminal device to the second terminal device according to the control instruction, wherein the second terminal device acquires the shared media content from the shared media content list, wherein the control instruction is an instruction invoked by the second terminal device according to the private SCPD document.

5. The first terminal device according to claim 4, wherein the transceiver comprises:
   a near field communication NFC transmitter, configured to establish an NFC channel with the other terminal device, and send the first private information to the other terminal device through the NFC channel; or
   a Bluetooth transmitter, configured to establish a Bluetooth piconet with the other terminal device, and send the first private information to the other terminal device in the Bluetooth piconet; or
   an image encoder, configured to encode the first private information to generate a two-dimensional code image, and display, through a display, the first private information corresponding to the two-dimensional code image form, so that the other terminal device captures the two-dimensional code image and acquires the first private information; or
   a sound encoder, configured to encode the first private information to generate a sound wave signal, and propagate the sound wave signal through a speaker, so that the other terminal device receives the sound wave signal through a microphone and acquires the first private information by decoding the sound wave signal.

6. The first terminal device according to claim 4, wherein the transceiver module is further configured to receive first private information of the second terminal device sent or displayed by the second terminal device.

7. The first terminal device according to claim 4, wherein the processor is further configured to:
  access a wireless local area network (WLAN) and acquire a network identifier of the WLAN;
  determine, according to the network identifier, whether the WLAN is a public network; and
  when the WLAN is a public network, enable the private sharing mode.

8. The first terminal device according to claim 4, wherein the processor is further configured to:
  access a wireless local area network (WLAN) and acquire a network identifier of the WLAN;
  determine, according to the network identifier, whether the first terminal device accesses the WLAN for the first time;
  when it is determined, according to the network identifier, that the WLAN is the WLAN that is accessed by the first terminal device for the first time, generate prompt information to prompt a user whether to select the private sharing mode; and
  when the transceiver receives selection information that is sent by the user according to the prompt information and the selection information indicates that the user selected the private sharing mode, enable the private sharing mode.

9. The first terminal device according to claim 4, wherein the processor is further configured to:
  access a wireless local area network (WLAN) and acquire a network identifier of the WLAN;
  determine whether the network identifier and a medium access control (MAC) address of a wireless access point (AP), corresponding to the network identifier, is stored in an access point list; and
  when the network identifier and the MAC address of the AP, corresponding to the network identifier, is stored in the access point list, enable the private sharing mode.

* * * * *